April 15, 1958  E. P. G. WRIGHT ET AL  2,831,179
INFORMATION HANDLING EQUIPMENT
Filed Aug. 16, 1954  29 Sheets—Sheet 19

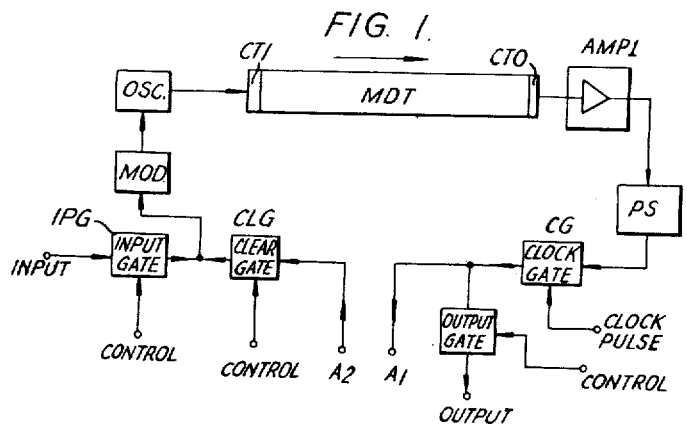
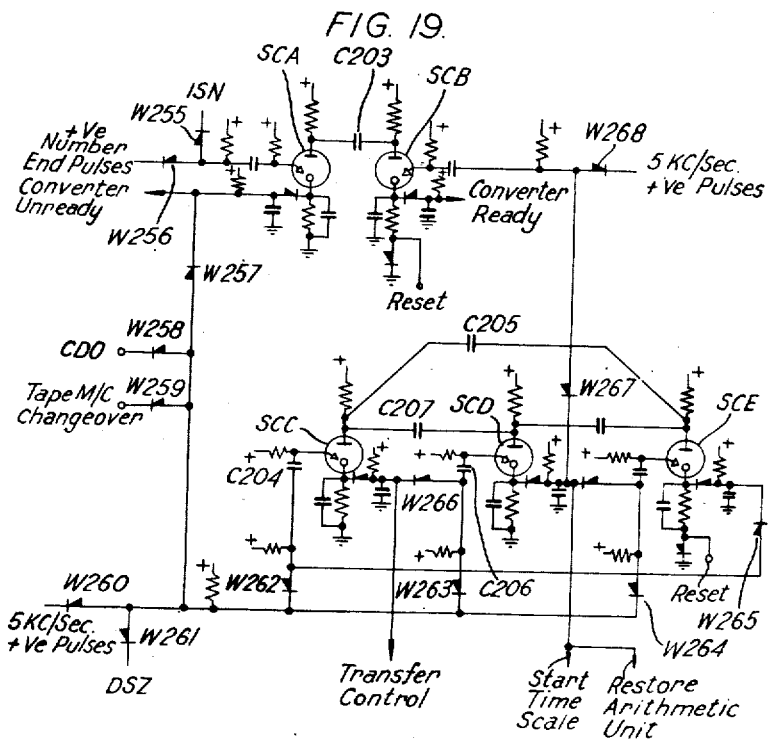

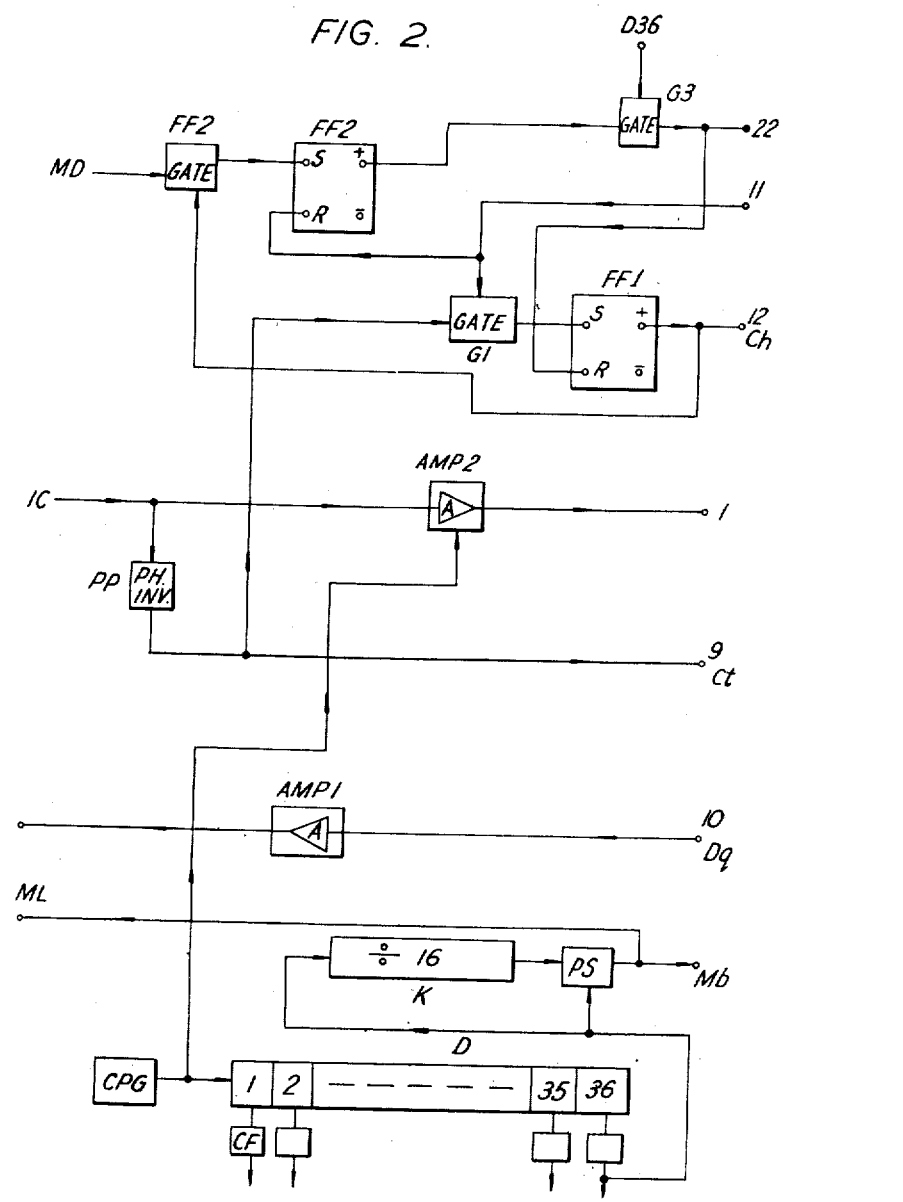

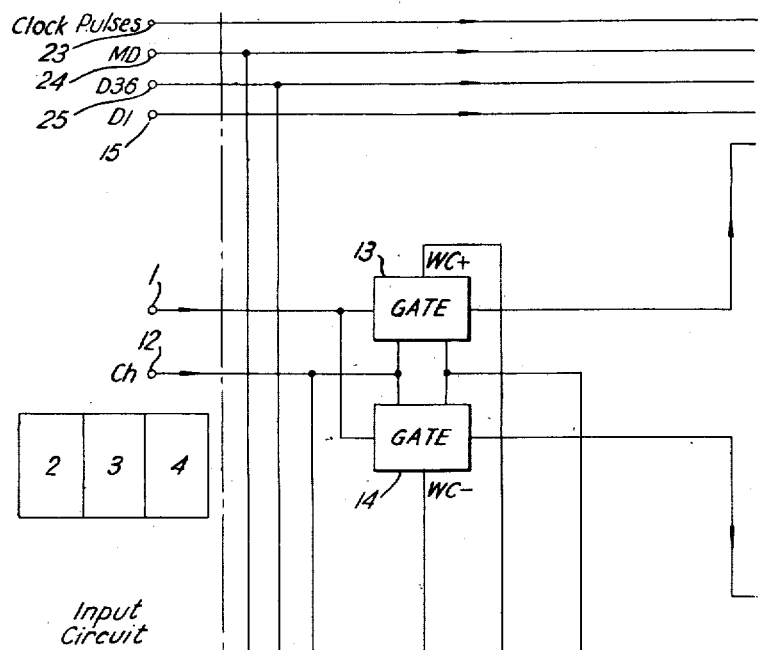
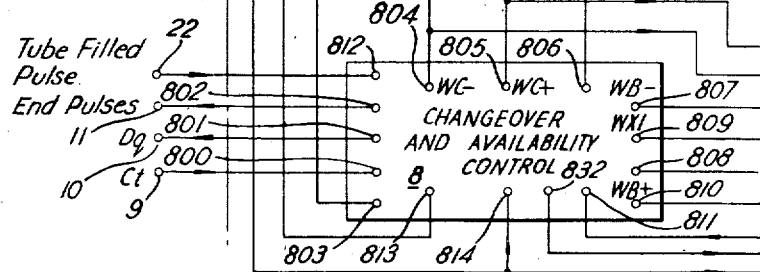
FIG. 3.

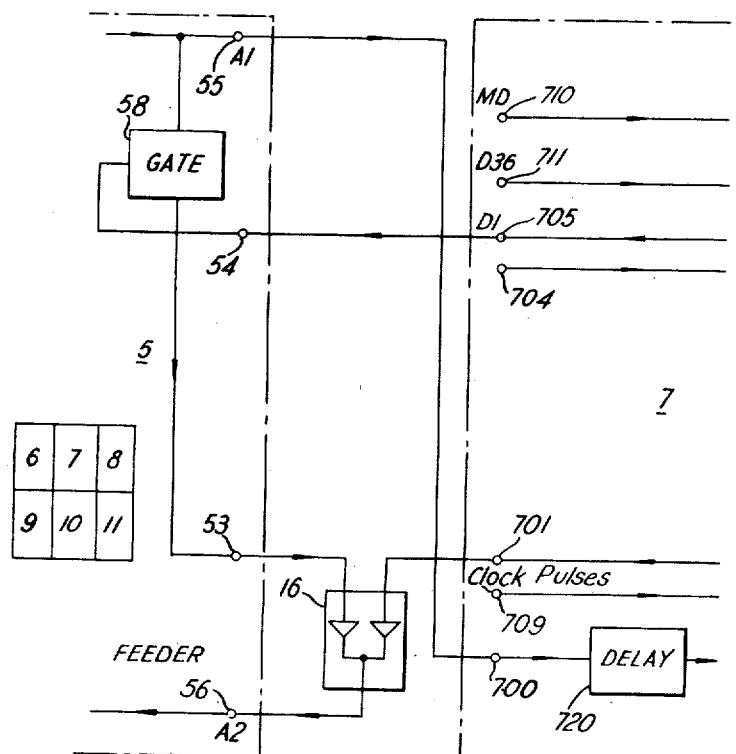
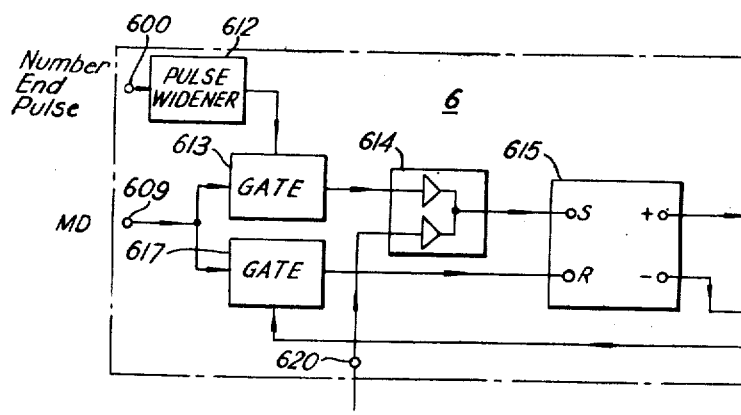
FIG. 6.
Inventors
E. P. G. WRIGHT-
D. A. WEIR-
J. RICE
By Robert Hardy Jr.
Attorney

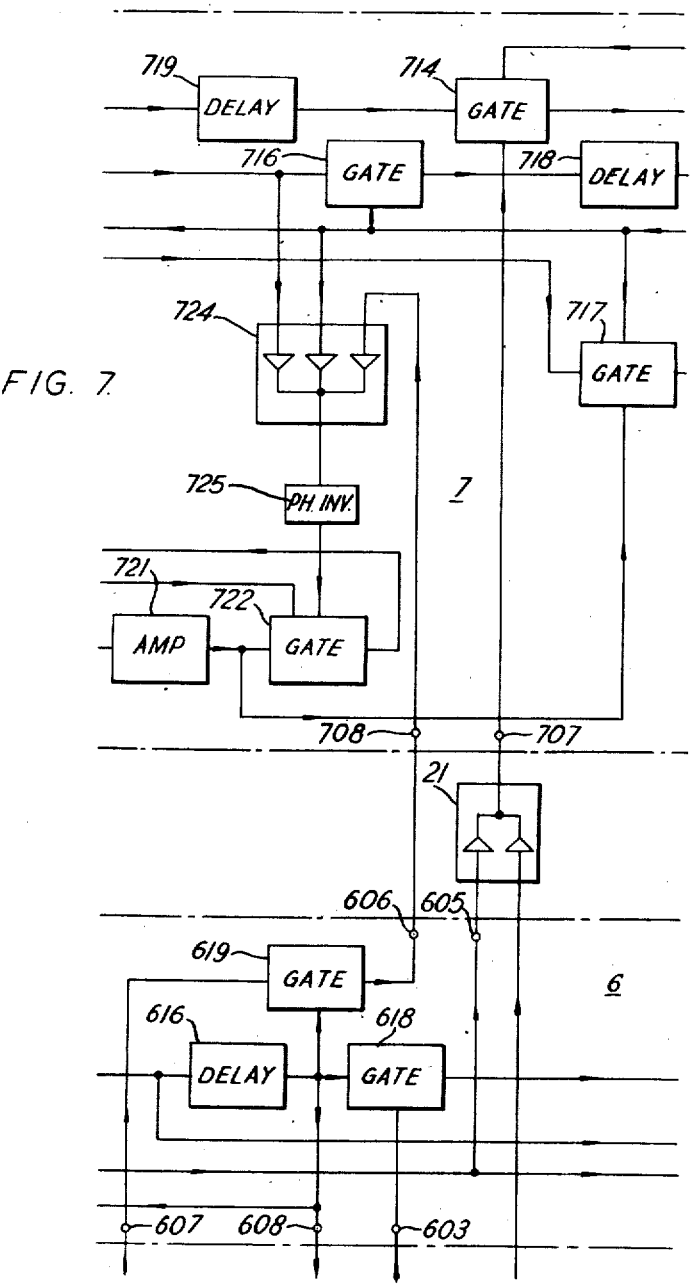

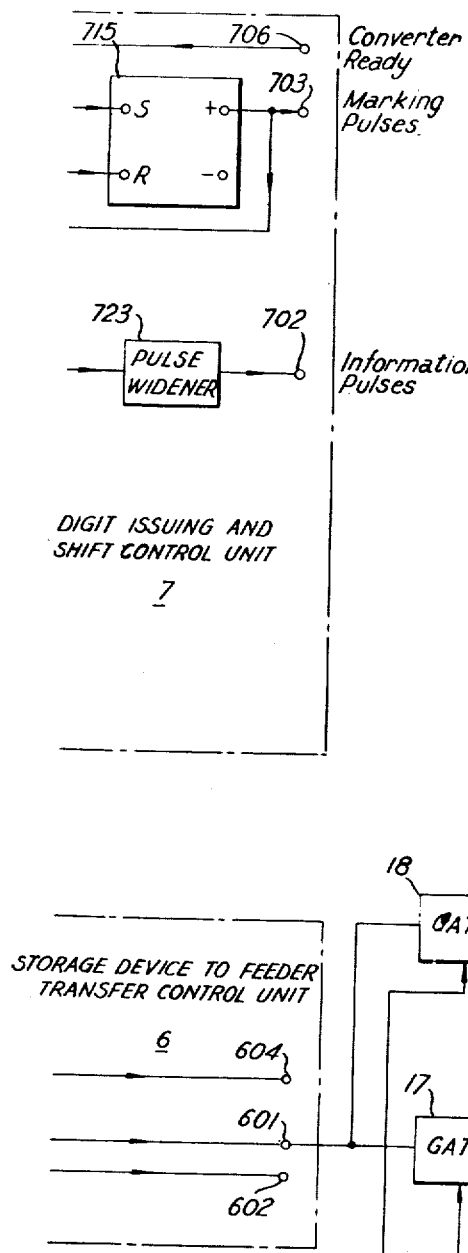

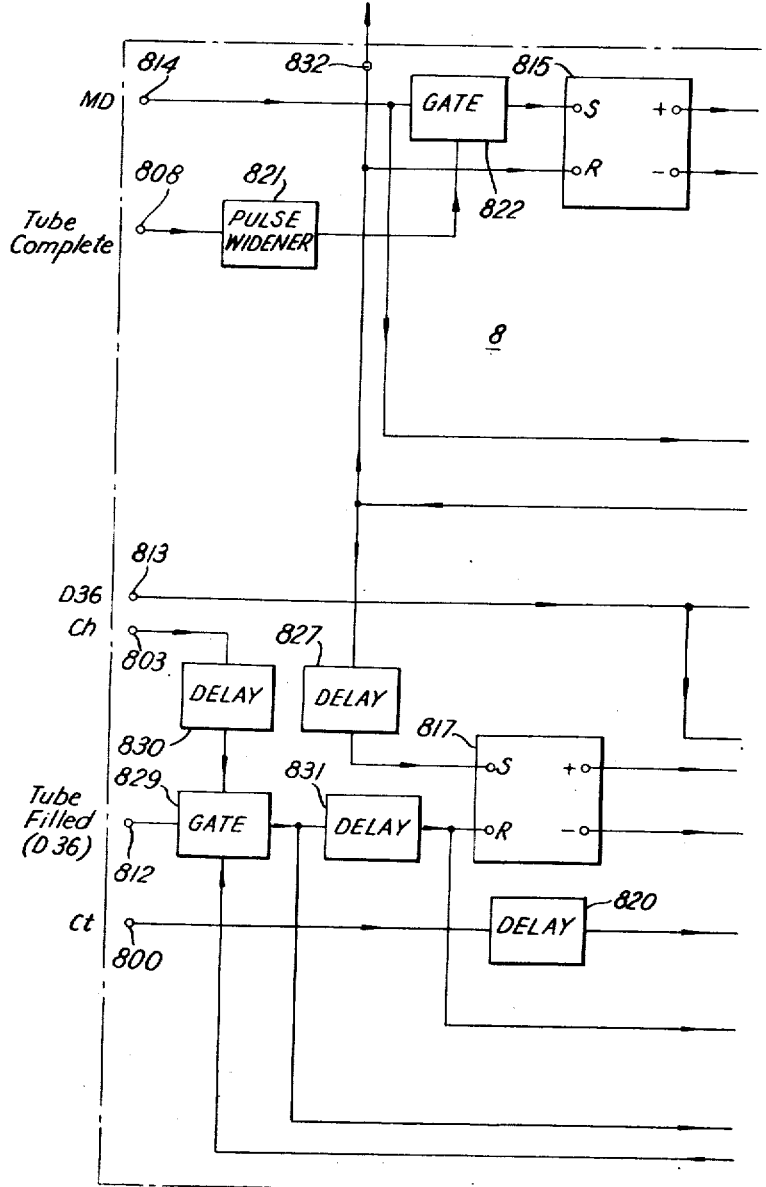

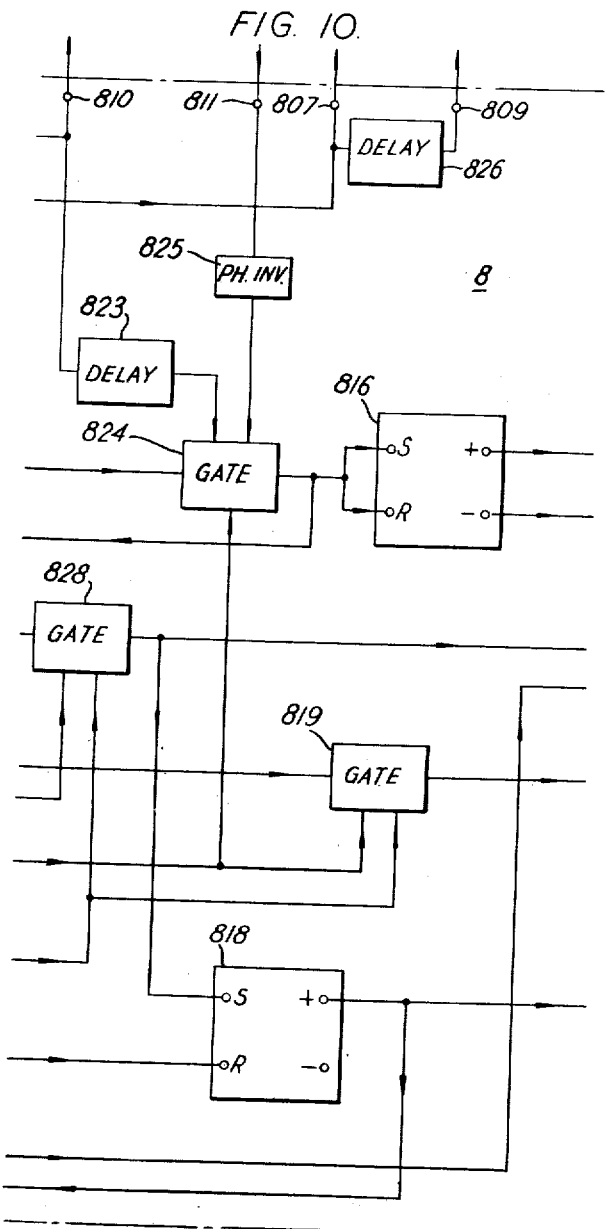

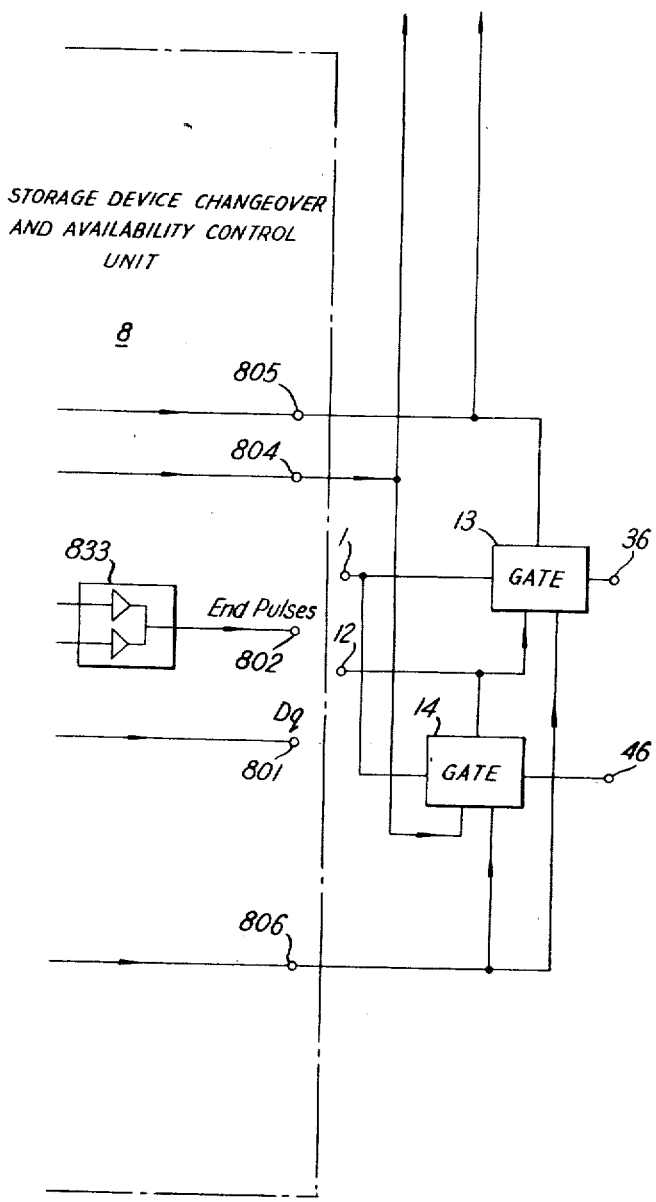

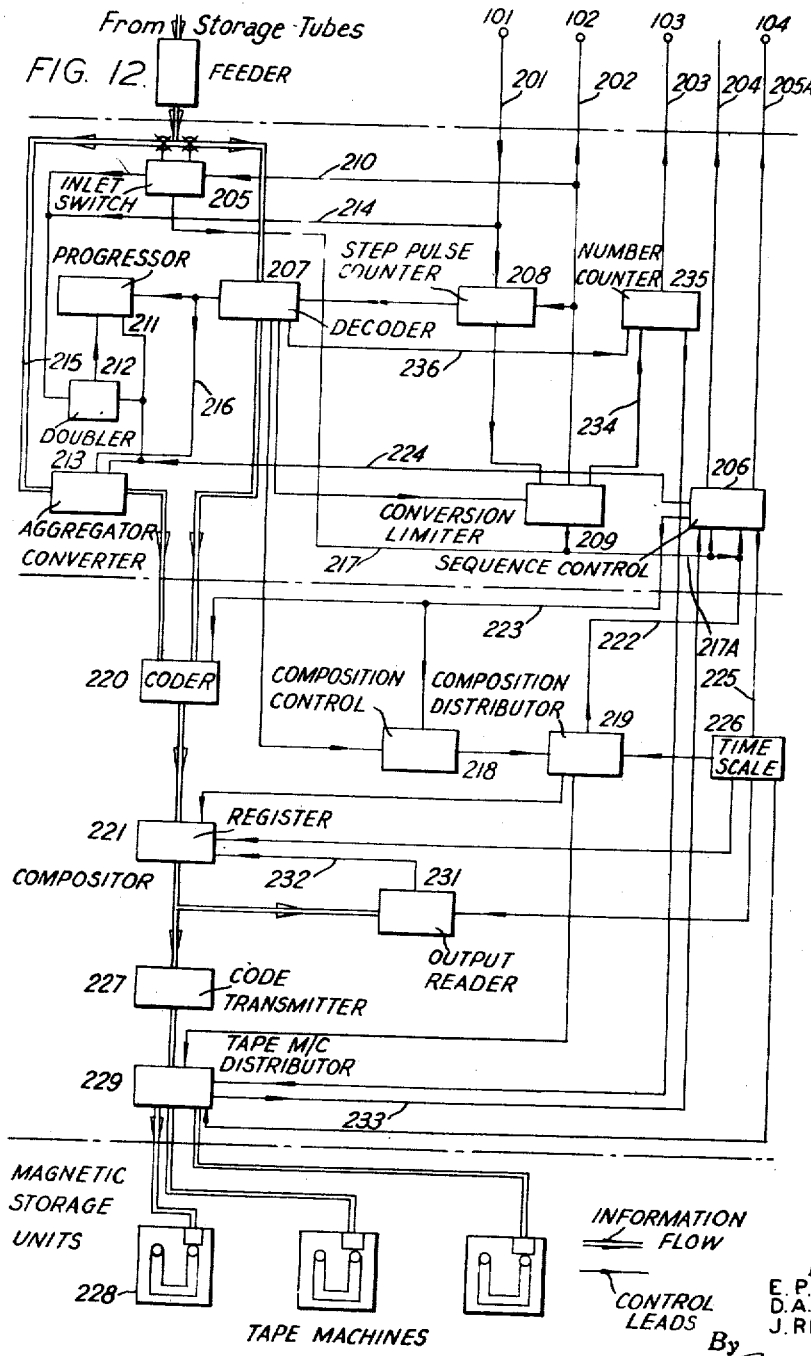

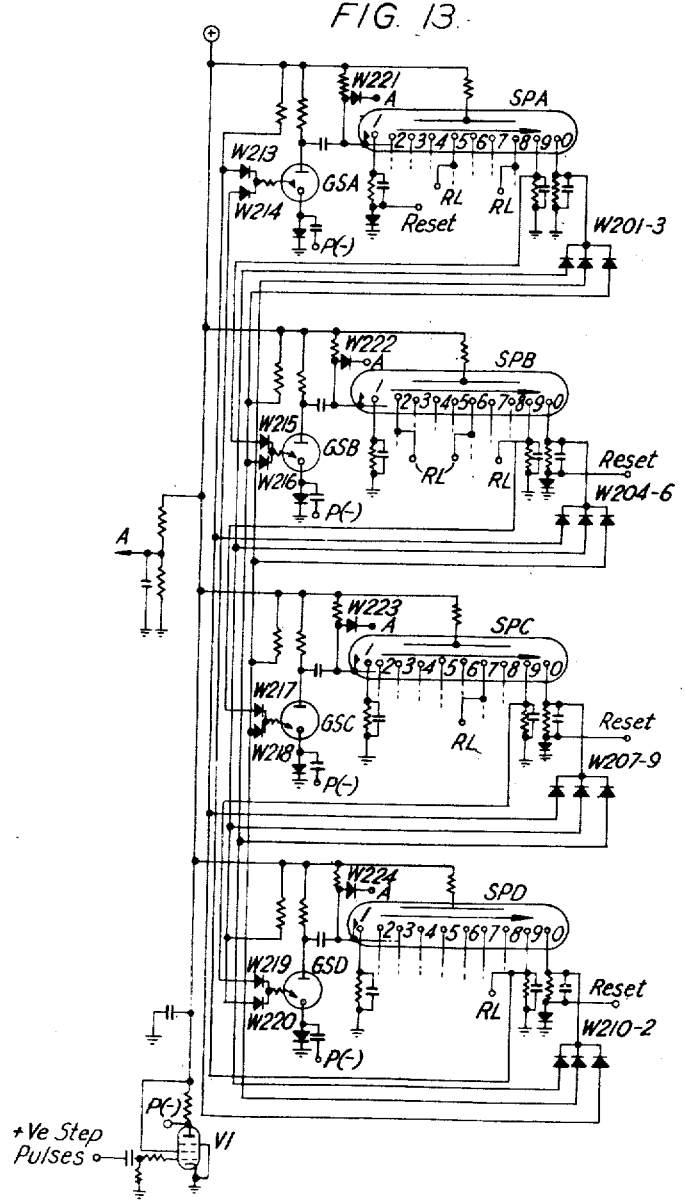

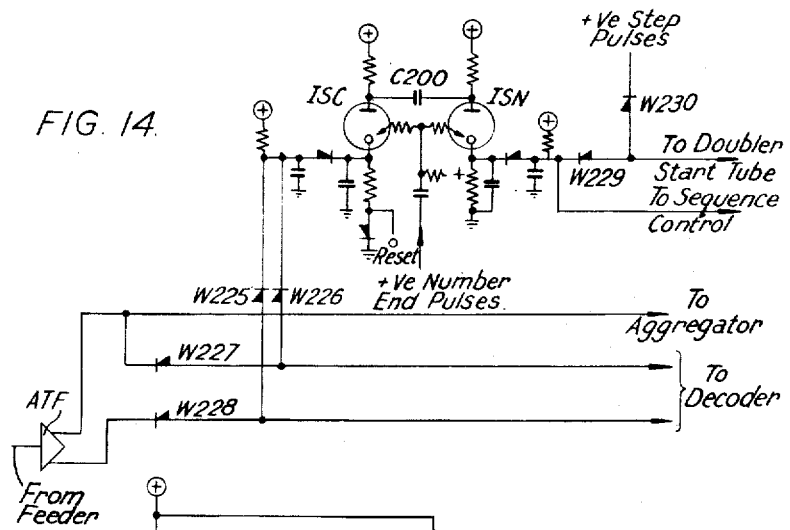
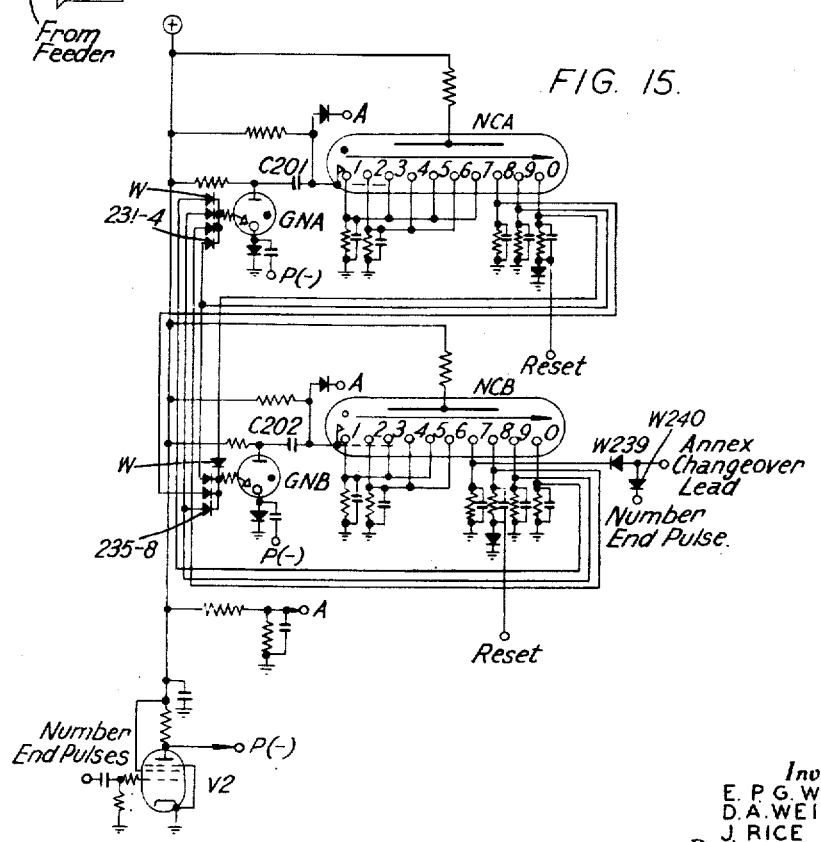

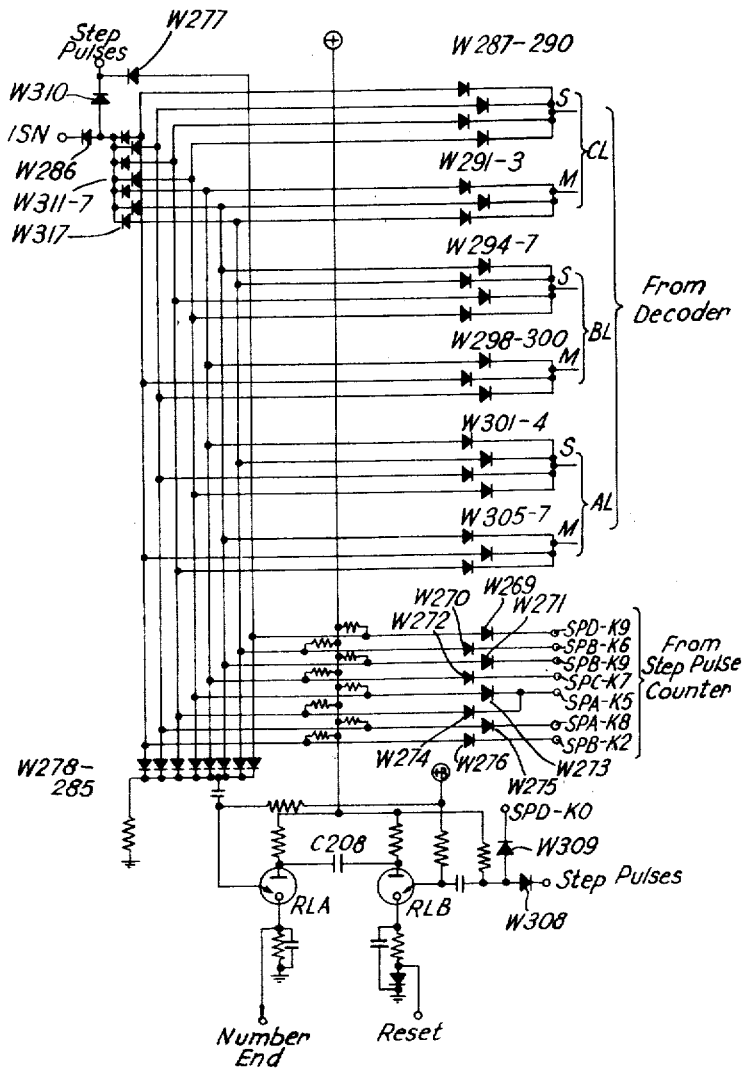

Inventors
E. P. G. WRIGHT-
D. A. WEIR-
J. RICE
By
Attorney

April 15, 1958 — E. P. G. WRIGHT ET AL — 2,831,179
INFORMATION HANDLING EQUIPMENT
Filed Aug. 16, 1954 — 29 Sheets-Sheet 20

Inventors
E. P.G. WRIGHT-
D.A.WEIR-
J. RICE
By
Attorney

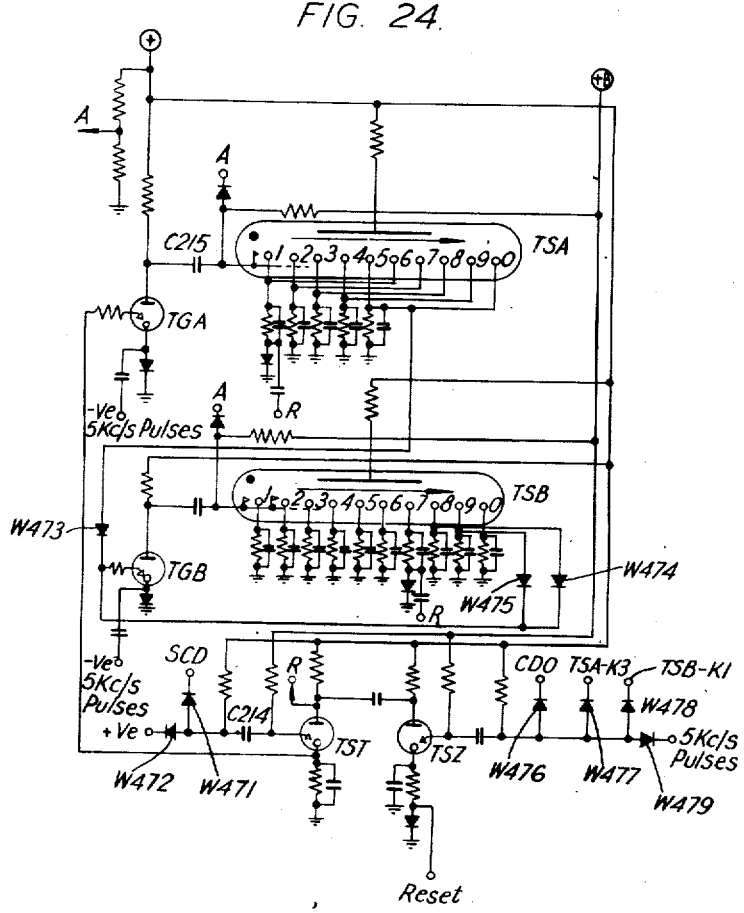

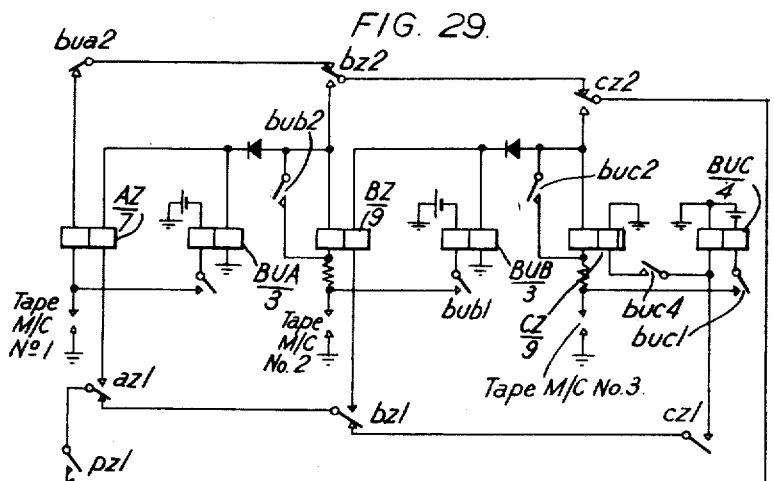
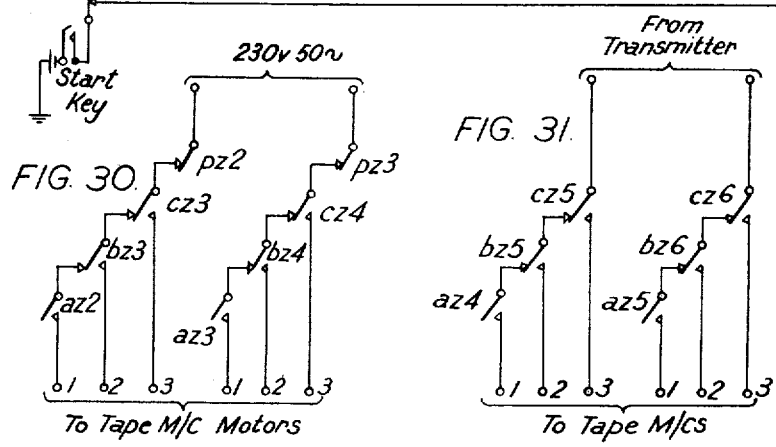
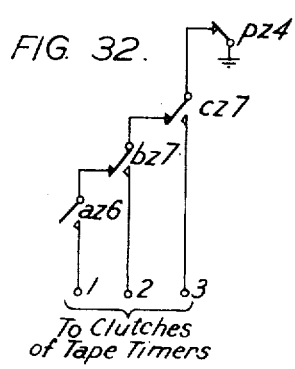
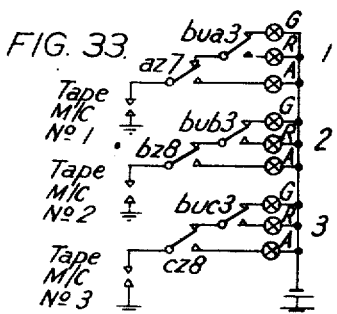

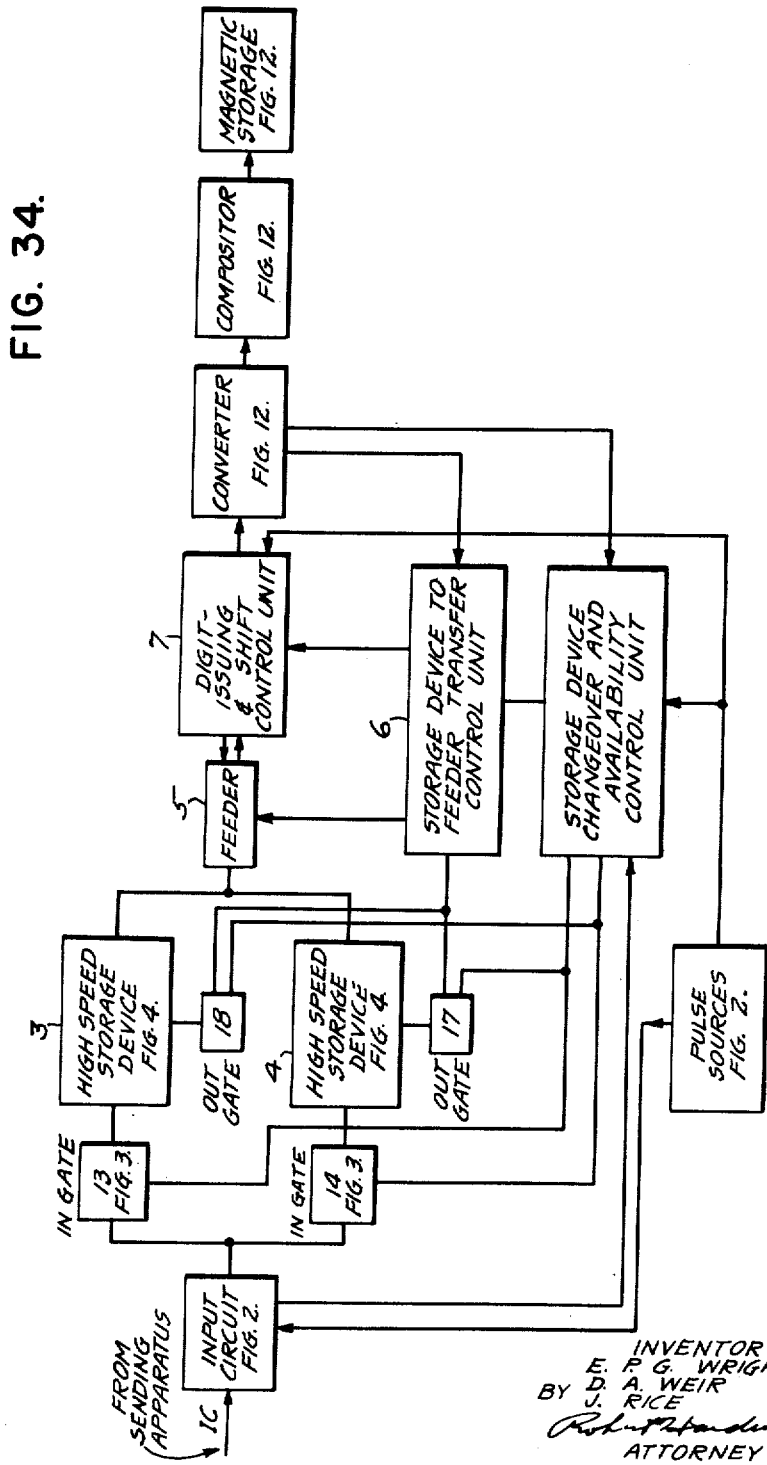

United States Patent Office 2,831,179
Patented Apr. 15, 1958

2,831,179
INFORMATION HANDLING EQUIPMENT

Esmond Philip Goodwin Wright, Donald Adams Weir, and Joseph Rice, London, England, assignors to International Standard Electric Corporation, New York, N. Y.

Application August 16, 1954, Serial No. 450,185

Claims priority, application Great Britain December 2, 1949

4 Claims. (Cl. 340—174)

The present invention relates to information handling equipment, and especially to such equipment wherein information received in a first code form is converted into information in a second code form.

This application is a continuation in part of application Serial No. 198,326, now abandoned, entitled "Electric Signalling System," filed November 30, 1950.

According to the present invention, there is provided an input circuit over which information is received, an output circuit over which information may be transmitted, a converter for converting received information from one form of presentation into another, and means whereby information is fed from said input circuit to said output circuit via a plurality of stages at successively lower speeds with intermediate conversion of the form of presentation of said information between two of said stages.

The invention will now be described with reference to the accompanying drawings, in which:

Fig. 1 represents schematically a mercury delay line storage unit, several of which are used in the system herein described;

Fig. 2 shows the input circuit to the system described herein;

Figs. 3–5 show schematicaly in a simplified form the annex circuits, which include the mercury delay lines. The inset to Fig. 3 shows how these figures should be fitted together;

Figs. 6–11 show the annex circuits, with the exceptions of the mercury delay lines, in somewhat greater detail. The inset to Fig. 6 shows how these figures fit together;

Fig. 12 is a block schematic of the arrangements for extracting information from the annex circuits, converting it into usable form and recording it on magnetic tape machines;

Figure 16:
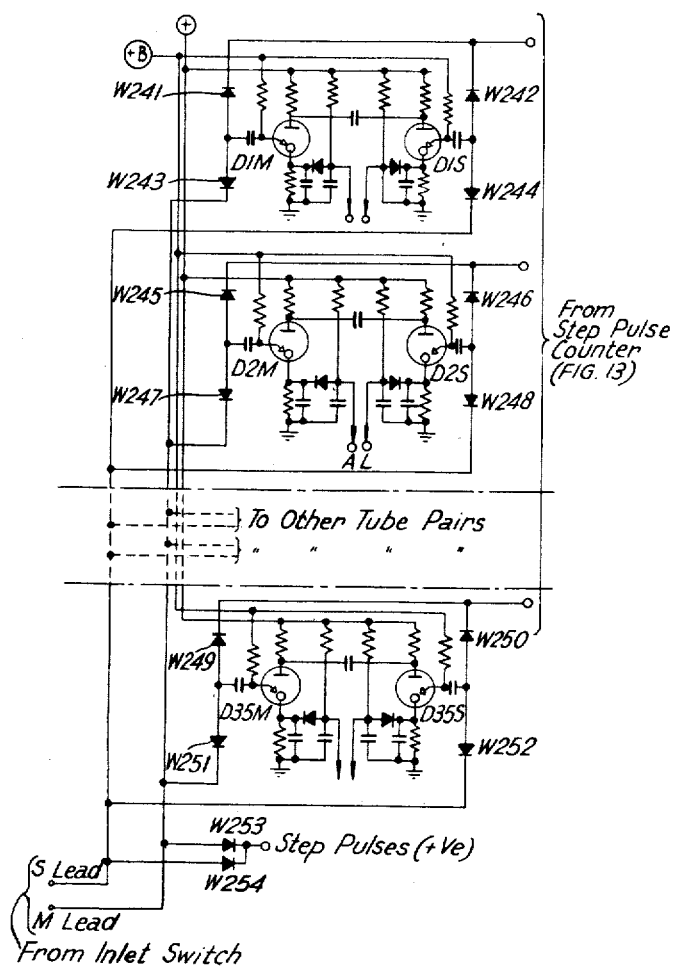
Figure 17:
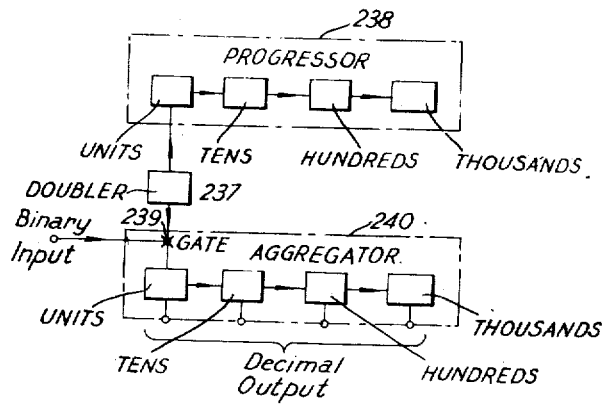
Figure 18:
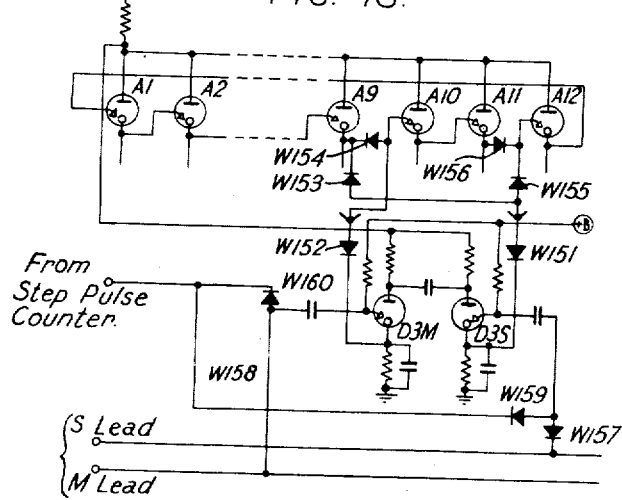
Figure 21A:
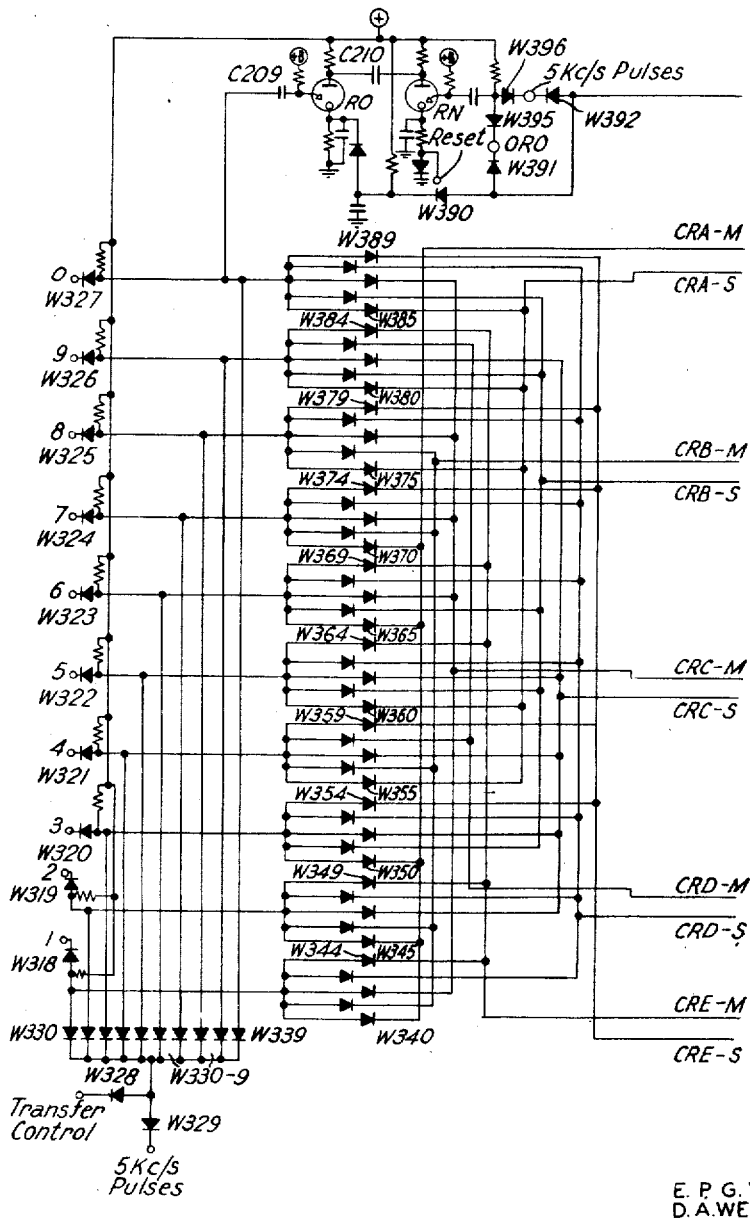
Figure 21B:
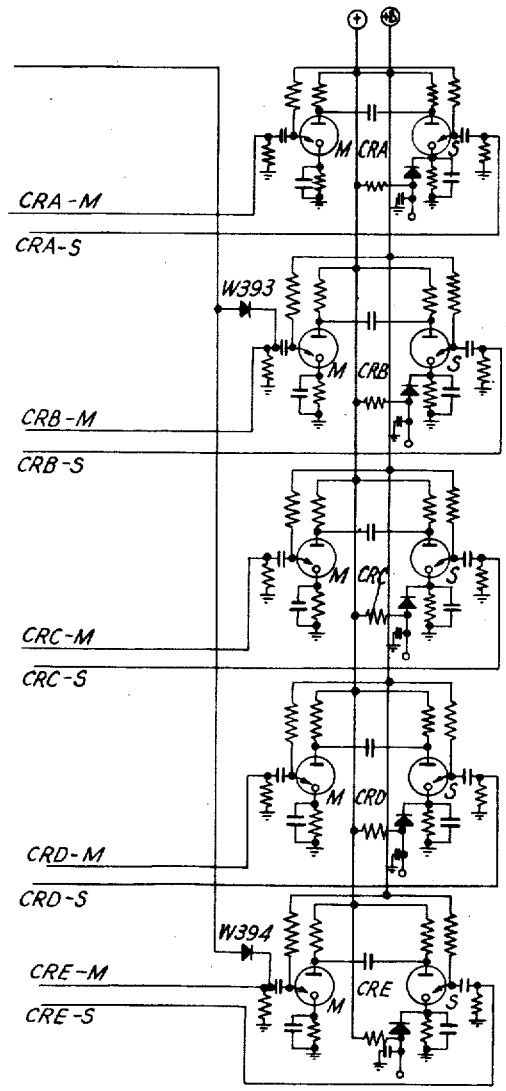
Figure 22:
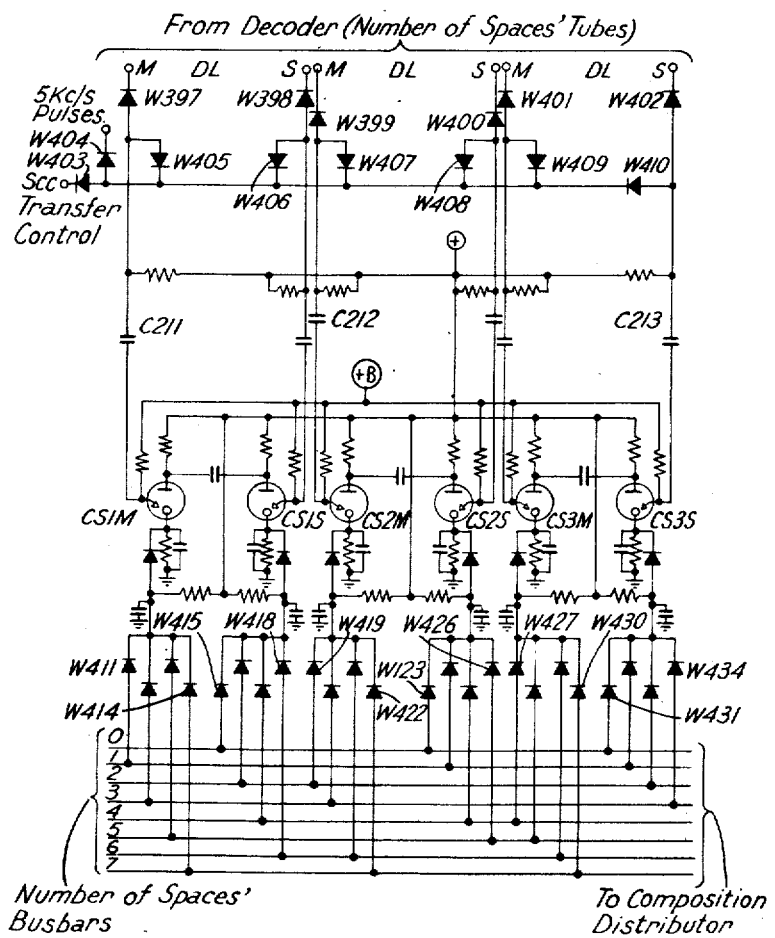
Figure 23A:
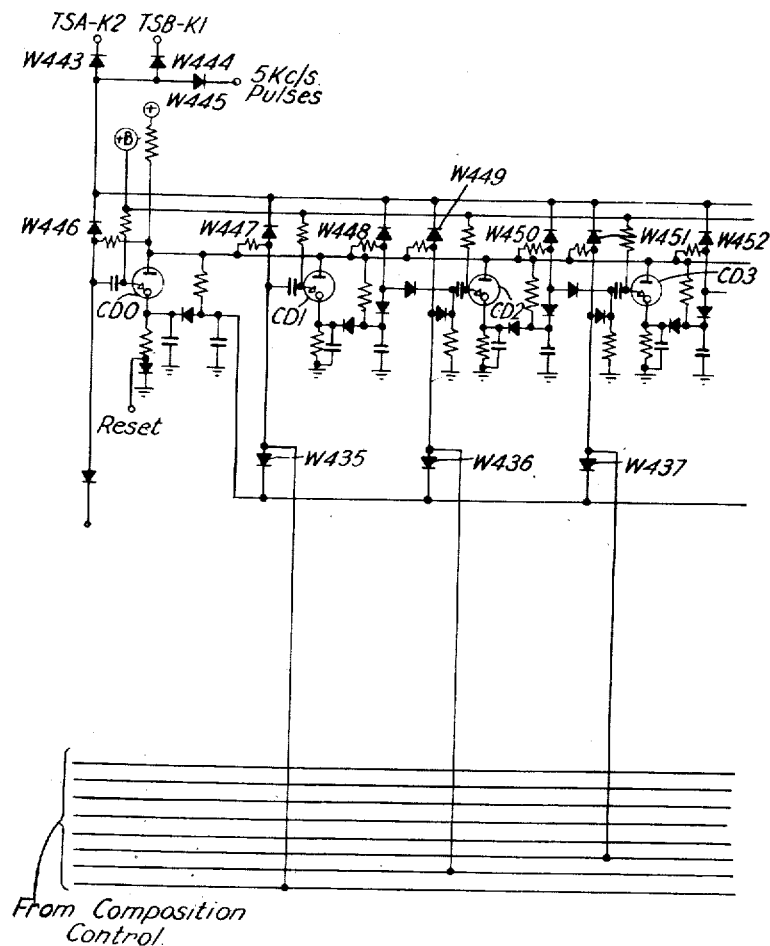
Figure 25:
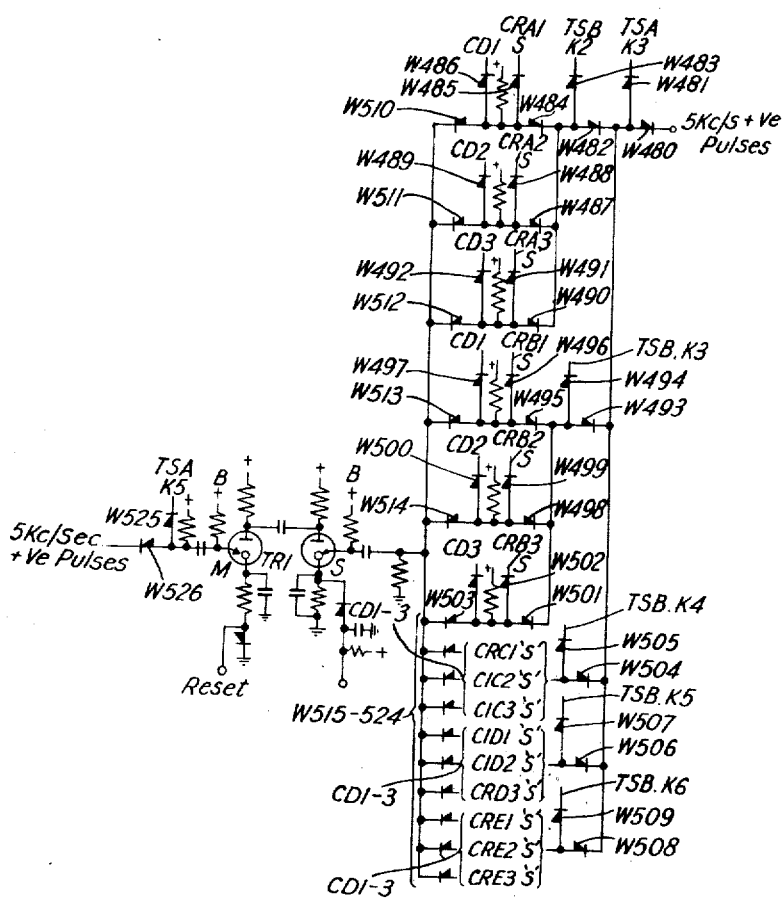
Figure 26:
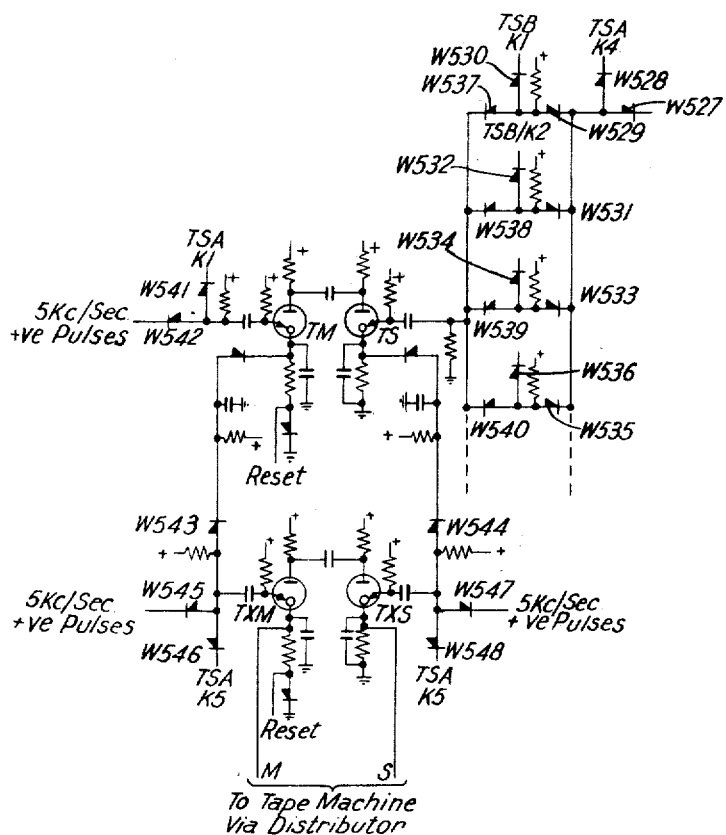
Figure 27:
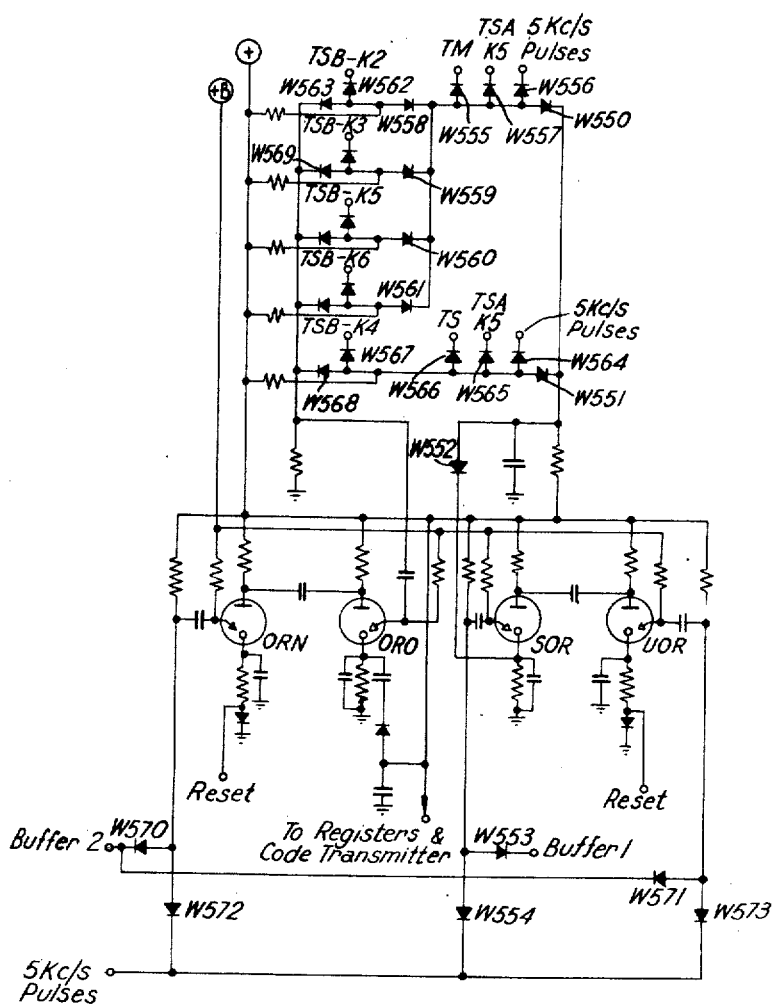
Figure 28:
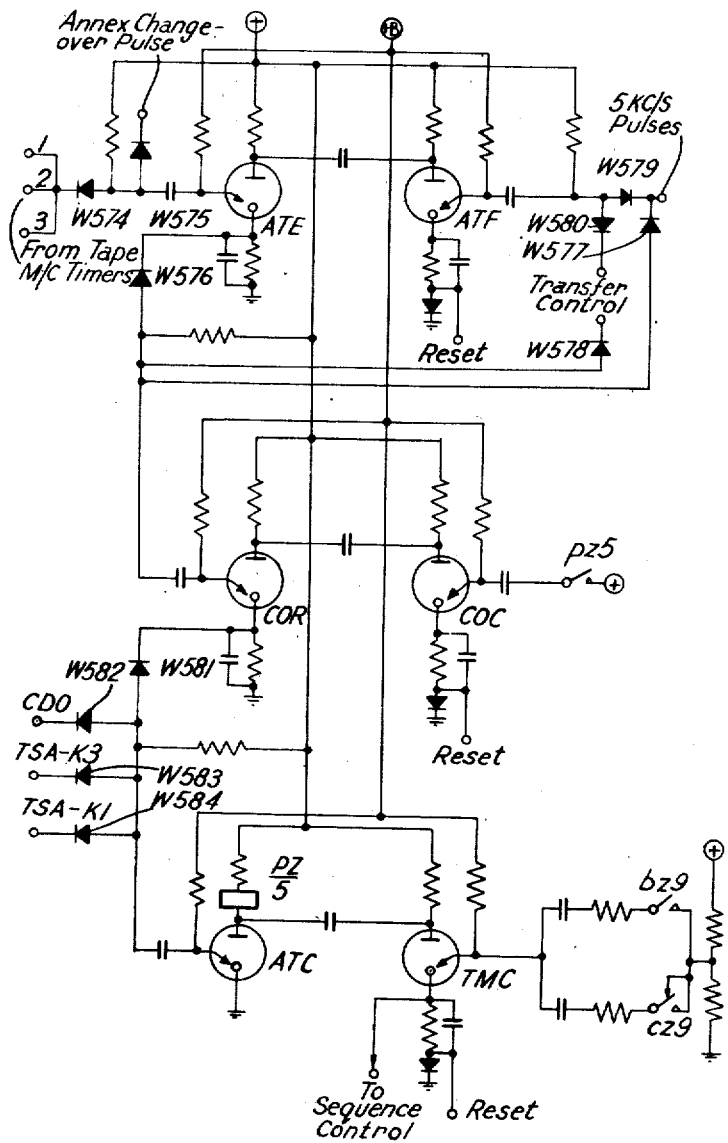

Fig. 13 provides the circuit of the step pulse counter which is a unit of the converter;

Fig. 14 shows the inlet switching arrangement of the converter;

Fig. 15 is the number counter circuit which controls the passage of information from the annex to the converter;

Fig. 16 is the decoder to which certain of the information from the annex is fed;

Fig. 17 is a block schematic of the arithmetic unit to which the remainder of the information is taken;

Fig. 18 shows the arrangement for controlling the operation of the arithmetic unit, which arrangement is dependent on whether the unit is required to deal with decimal or sterling information;

Fig. 19 is the circuit diagram of the sequence control which accomplishes the transfer of information from the converter to the compositor, the latter controlling the recording of the information;

Fig. 20 is the conversion limiter circuit which is operable to speed up the extraction process when lesser quantities of information than normal are received;

Fig. 21A is one of the coders in the compositor by means of which converted information is coded into a form suitable for recording, and Fig. 21B is a register which stores the coded information obtained from the Fig. 21A circuit;

Fig. 22 shows the composition control apparatus which sets the composition distributor in accordance with the recording requirements individual to each particular number from the annex;

Figs. 23A and B together are a circuit diagram of the composition distributor which controls the actual recording;

Fig. 24 is a circuit diagram of a time scale which synchronises various operations in the converter and compositor;

Figs. 25 and 26 both show different parts of the transmitter circuit which transfers the information to be recorded from the register to the recording head of the magnetic tape machine;

Fig. 27 shows the output reader which scans the information transferred from the register and controls certain operations therein;

Fig. 28 is the discharge tube circuit portion of the tape machine distributor which controls the passage of information to an appropriate tape machine;

Fig. 29 is the relay circuit portion of the same distributor;

Fig. 30 is the relay contact diagram relating to the supply of power to the various tape machine motors;

Fig. 31 shows the relay contact arrangement over which information is transferred to the tape machine in use;

Fig. 32 shows the relay circuit for energising the timing mechanisms of the different tape machines in turn;

Fig. 33 shows the "ready state" indication system for the tape machines; and

Fig. 34 is a block diagram of the entire system.

In the system to be described herein, information reaches the equipment over an input channel as a block of information preceded by a prefix signal. The latter consists of a pulse which causes an availability test, and initiates operation if a channel is free. If the system tests busy or unavailable a return signal is sent which "tells" the sending end to withhold transmission. The sending end will later make a further attempt if it receives a busy signal.

The information consists of a block of numbers, assumed to consist of not more than 16 numbers, each of which consists of up to 36 binary digits. Each digital place is occupied either by a positive pulse or by no pulse. The former represents one and the latter zero. The digits in each number are received least significant digit first. The significance of a digit is only indicated by its position in the number.

First a mercury delay line storage unit will be described with reference to Fig. 1.

*Mercury delay line*

(Fig. 1)

Mercury delay lines are well known, and are described in detail in a paper entitled "Design of mercury delay lines," by Sharpless, in "Electronics," vol. 20, No. 11 (November 1947), at pages 134–138, and in an article entitled "An ultrasonic memory unit for the EDSAC," by Wilkes and Renwick, in "Electronic Engineering" for July 1948, at pages 208–213. In view of these publications a brief description only is necessary here.

To return to Fig. 1, a mercury delay storage unit comprises a mercury delay tube MDT, with piezo-electric elements CT1 and CT0, one at each end. The output pulses from the element CT0 are passed in succession through amplifier AMP1, pulse shaper PS, a gating circuit CG to which clock pulses are applied and then in parallel to both the output gate OPG and the A1 terminal. If the A1—A2 link is made the pulses pass from the A1 terminal to the A2 terminal and therefrom through the clear gate CLG, and modulator MOD, which controls the output of an oscillator OSC. Pulses from the input gate IPG are also applied to the modulator MOD. Each of the gates has a control lead, these being designated in the later diagrams IG for the input gate control, CG for the clear gate control, and OG for the output gate control.

There are two sorts of mercury delay tubes used, one having a length equal to 35 digital places, and one having a length of 576 digital places, the latter having accommodation for 16 numbers, there being a blank digital place between consecutive numbers.

Input circuit
(Fig. 2)

This circuit employs a number of units each of which is itself of well-known type, which units are therefore represented schematically. Coincidence gates are shown as blocks labelled "Gate" and each having an output and a number of inputs all of which must be simultaneously energised to produce an output. This output persists for the duration of the shortest input. A mixer gate is shown as at MG, and gives an output when any one of its inputs is energised. This can be achieved by using rectifiers or vacuum diodes. Bistable circuits of the Eccles-Jordan type, which are hereinafter designated flip-flops, are shown as a rectangle with a set terminal S, a reset terminal R, and + and − output terminals. A pulse on the terminal S or R causes the flip-flop to assume the set or re-set condition respectively, in which case a positive potential appears on the + or − terminal respectively.

A counter is shown as a linear array of contiguous rectangles with a common input lead connected to its lefthand end. Such counters can use interconnected flip-flops only one of which can be set at once. Each pulse on its input causes the next flipflop along the line to assume its set condition, the previously set one being re-set. The outputs from the counters which are shown are the + outputs. Cathode followers are shown as rectangles in which appear the letters CF, while phase inverters are shown as rectangles in which appear the letters Ph. Inv., and pulse shapers have PS in their rectangles.

On reception of the prefix, the inverted output of the phase inverter PP, connected to the incoming channel IC, causes the annex circuit to be tested. The output from PP is applied via terminal 9 to the annex circuits, where it causes an availability test to be performed. The signal which passes via terminal 9 is designated $C_t$. If the annex includes an empty storage tube a signal is received back via terminal 11 and this, with the output from PP causes a gate G1 to open. When G1 opens, it operates flip-flop FF1 to its set condition. The output of FF1 is applied via terminal 12 to the annex circuits where it forms the $C_h$ signal. The signal on 11, which occurs at counter time D36, resets flip-flop FF2 from its set condition.

If there is no empty tube in the annex a busy condition exists and a signal $D_q$ is received over terminal 10 which is sent via amplifier AMP1, where it inhibits transmission. The equipment at the sending end therefore does not send its information. It may try later to see if the annex is still busy.

After a $C_h$ has been produced the information passes to the terminal 1 leading to the annex via amplifier AMP2, which is clock-pulse controlled so as to produce properly-timed pulses from the received signals. After the block ends, a major cycle pulse (see below) MD occurs, and this, with the + output of FF1 opens a gate G2 to set FF2 to +, so that a D36 pulse is gated via G3 and terminal 22 to the annex to form a "Tube filled" signal. This signal is also used to reset FF1. The circuits of Fig. 2 are now back to normal.

All that remains to be described of Fig. 2 is the clock pulses circuitry. This consists of the clock pulse generator CPG, which drives the counter D. Various outputs from D are used to provide timing pulse trains, and each output so used is provided with a cathode follower such as CF for D1. The output from D36 drives a divide-by-16 circuit K, whose output is applied to pulse shaper PS, and with D36 generates the major cycle pulse MD. This is fed back over a lead ML to the sending end to ensure that the clock pulses are synchronized with the transmitting station.

Next the annex circuits will be dealt with.

Annex circuits

Figure 4:
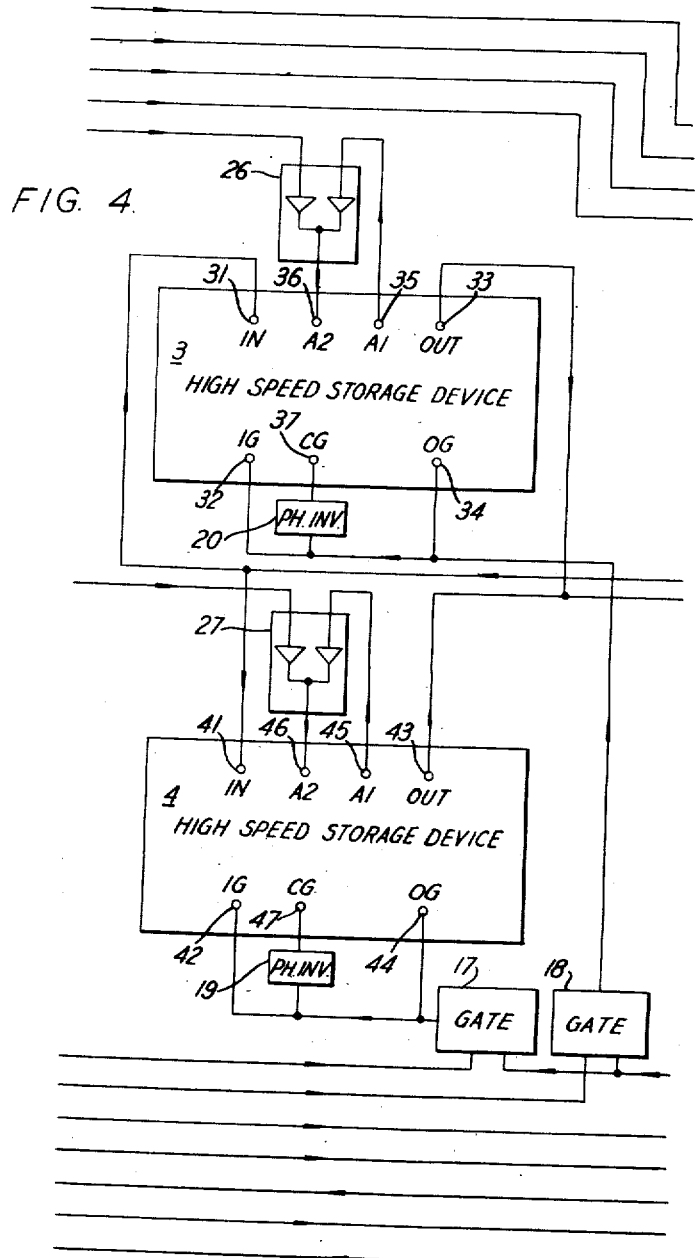
Figure 5:
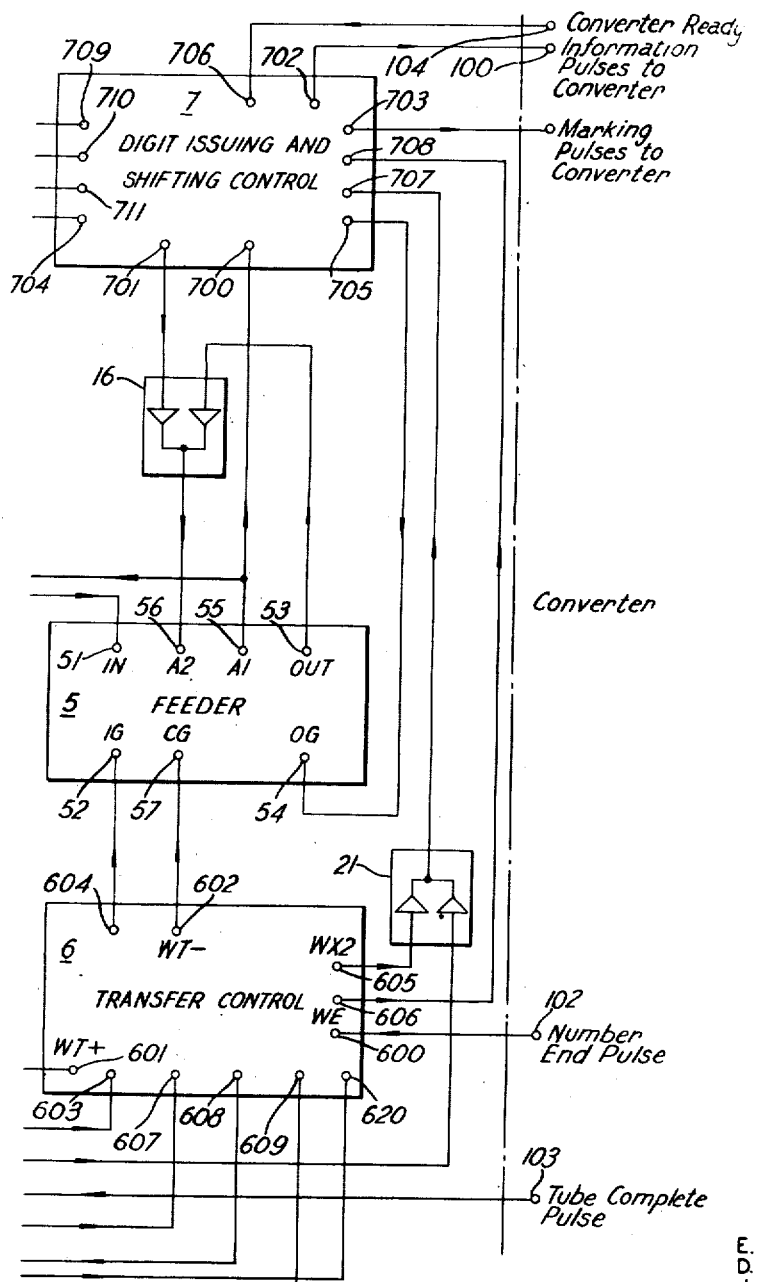

Figures 3–5 show the general arrangement of the so-called annex switching used in a system according to the invention. The function of this apparatus is to accept binary, high speed, digit pulses appearing at terminal 1 and representing the received information and ultimately to apply corresponding pulses, a digit at a time, to the terminal 100 of a converter (Fig. 5). The digit pulses appear in order with the least significant first, each item of the information being a binary number.

As a first step, however, a group of incoming pulses are transferred to one of two high speed storage devices 3 and 4 (Fig. 4) each of which has a capacity such as to be able to store the pulses in one major cycle. A major cycle consists of the number of pulse positions involved in 16 numbers, each number having 36 pulse positions. One number block, i. e. 576 pulse positions, constitutes a major cycle. Actually, the numbers are 35 digit numbers, there being a blank space between consecutive numbers. The received information is in blocks, each of 16 numbers, i. e. each lasting one major cycle, so that a block fills one of the high speed storage devices. When a high speed storage device has been thus filled with pulses, pulses are withdrawn from it, in groups corresponding to the minor cycles within the major cycle, by a feeder 5 (Fig. 5), under the control of a control unit 6. The feeder 5 consists essentially of a storage device having a cyclic time of a minor cycle.

The pulses now stored in feeder 5 are transferred, one at a time, to converter terminal 100, under the control of a digit issuing and shifting control unit 7. When the contents of the feeder have been thus transferred to terminal 100, the feeder is again filled from the high speed storage device and the process is repeated until the latter is empty.

During the time that one of the storage devices is being emptied in this way, it is possible for the other to be filled by pulses received at terminals 1, under the control of a changeover and availability control unit 8. The feeder 5, under control of the control unit 6, is then used to empty the second storage device in similar fashion.

Clearly, received information must not be sent to equipment such as in Figs. 3–5 unless an empty high-speed storage device exists, and therefore means are provided to give an indication of said availability. With this object, the input circuit is caused to transmit an enquiry signal and means are provided to transmit to the input circuit different responding signals, indicating whether or not there is a storage device available.

This function is part of the function of unit 8, which receives an availability test signal $C_t$, from terminals 9, which is applied to terminals 800 of the control unit 8.

In the event of the response to the test signal indicating that the channel is unready to receive information there appears at terminals 801 of the control unit 8 an "unreadiness" pulse $D_q$ which is transmitted to the terminals 10.

If the channel is avaliable, a readiness or "test successful" signal in response to the test signal appears at terminals 802 of the control unit 8 and is transmitted to terminals 11.

The input circuit then passes the information to the channel shown, and sends a signal which appears as a control voltage (identified as $C_h$) at terminals 12 and is fed to terminals 803 of the unit 8.

The voltage $C_h$ is also fed to the gate circuits, or more briefly the gates, 13 and 14 which are included in the transmission path of the pulses from terminal 1 to the storage devices 3 and 4. These two gates are also controlled by changeover control signals, which can be identified as WC— and WC+ produced respectively at terminals 804 and 805 of control unit 8. By this means, it is arranged that at no time can both of the gates be open. The pulses from terminal 1, applied to both gates, can thus pass out from one only of the gates; gate 13 is connected to storage device 3 and gate 14 to storage device 4. Changeover control unit 8 can thus control to which storage device the pulses are directed. These gates are so-called "coincidence gates"; one of them gives an output if all of its inputs are simultaneously energised. Rectifier gates of this type are described in a later part of the specification. Other forms of coincidence gate are also known, e. g. a multi-grid tube having separate inputs to the various grids.

In addition to controlling gates 13 and 14 by changeover control voltages WC— and WC+ at terminals 804 and 805, control unit 8 also controls these gates in accordance with the "readiness" signal at terminal 802. This is to minimize the risk of spurious responses to unwanted signals.

When signal $C_h$ occurs, one of the two gates 13 or 14 will open, and any pulses present at terminal 1 are accordingly transmitted to one or other of the units 3 or 4. The block of information which appears at terminal 1 has a duration of not more than one major cycle, and the prefix signals are so arranged, as described above, that the block ends on a major cycle pulse.

The units 3 and 4 are identical, and each consists essentially of a storage device which in this embodiment of the invention is of the mercury delay tube type, and means for controlling, re-shaping and re-circulating the pulses in the mercury. Such a unit is briefly described with reference to Fig. 1. The length of the column of mercury corresponds to the length of a major cycle, which is capable of storing 16 numbers. Units 3 and 4 have respectively input terminals 31 and 41 and input gate terminals 32 and 42. Control voltages applied to terminals 32 and 42 determine whether or not pulses applied to terminals 31 and 41 are admitted to the circulating pulses. Similarly output terminals 33 and 43 are provided with corresponding output gate terminals 34 and 44. In these storage units the electrical path of the pulses may if desired be interrupted by removing a link between A1 and A2 terminals marked 35 and 36 for storage unit 3 and 45 and 46 for unit 4. The pulses held in circulation in the two storage units can be cleared independently by control voltages applied to the clear gate terminals 37 and 47 respectively. In passing it may be noted that while pulses may be fed in at inputs 31 and 41 only under the control of the voltages at the input gates 32 and 42 they may be fed into the circulation at any time at the A1, A2 terminals 35, 36 and 45, 46. It will be appreciated that the A1 and A2 terminals must be linked if the pulses are to continue circulating. As shown, the A1, A2, terminals of the unit 3 are linked through mixer 26 and those for unit 4 through mixer 27. A mixer is a form of a gate which gives an output when any one of its inputs is energised, but mutual interference between the inputs is not possible for example by the use of decoupling rectifiers or vacuum tubes. Gates using decoupling rectifiers will be fully described in a later part of the specification.

After the transfer of pulses to one or other of the storage units 3 or 4, the pulses will be circulating in that unit, and from this they are withdrawn, in groups, by feeder 5. The feeder 5 is a mercury delay line which has the same general arrangement as the storage units 3 and 4, and has input terminal 51, input gate terminal 52, output terminals 53, output gate terminals 54, A1 and A2 terminals 55 and 56, and clear gate terminals 57. The unit 5 differs from units 3 and 4 in two respects; firstly the length of the column of mercury corresponds to one minor cycle less one pulse, and secondly there is connected between A1 and A2 terminals 55 and 56 an additional delay circuit of a period equal to one pulse unit, so that the unit as a whole has a total capacity of 36 digits, corresponding to a minor cycle. This delay unit is included in the digit issuing unit 7, and for this reason the A1, A2 link of unit 5 is completed through terminals 700 and 701 on that unit.

The contents of a storage unit are transferred to the feeder one number at a time, by connecting the feeder 5 in series with one of the units 3 and 4, by means described hereinafter, for one major cycle, that is 16 minor cycles, after which they are disconnected and the pulses circulate independently again.

Whilst the storage unit and the feeder are connected in series the circulation time in the combined circuit is 17 minor cycles. The storage unit tube may be regarded as having 16 sections each of which is capable of storing the contents of the feeder tube, and each of which corresponds in time to a minor cycle. When the two tubes are connected in series for 16 minor cycles it follows that all the pulses will advance 16 sections in the circulation path. Hence, after 16 minor cycles the feeder tube will contain any pulses which at the beginning of the period of the series connection were in the last section of the storage unit tube, and the contents of the feeder will have been transferred to the first section of the storage unit. As will be shown later the feeder will have been emptied and left clear by the digit issuing and shifting control unit 7 before such a transfer takes place; thus when the series connection is broken and independent circulation is resumed the feeder will contain the contents of the last section of the storage unit, the first section of the storage unit will be empty, and similarly the remaining contents of the storage unit will have been retarded one place, so that the pulses which were previously in section 1 of the storage unit will now occupy section 2, and so on for the other sections, the pulse previously in section 15 now being in 16.

The contents of the now filled feeder 5 must next be issued a digit at a time to the converter. The latter can accept digits only at a repetition rate low compared with that used in the storage units. In order to facilitate the timing, the converter has been designed to accept binary digits for conversion at the rate of one every major cycle (that is one every 1.12 milliseconds), the pulses being emitted from the digit issuing and shifting control unit 7 at terminal 702 and fed to terminal 100 of the converter.

The converter also requires marking pulses from the storage unit in order to indicate the instant when a binary digit may be present or when there is a significant absence of a digit. The marking pulses are sent from terminal 703 of the digit issuing and shifting control unit 7 to terminals 101 of the converter. If the binary digit to be issued is one, both an information pulse and a marking pulse are sent. If the digit is zero a marking pulse only is sent.

The binary digit pulses appearing at terminal 702 of unit 7 are derived from the terminals 700—701, included in the A1—A2 link of the feeder circuit. D1 pulses at terminal 15, derived from the clock pulse counter D, are fed to terminal 704 of unit 7 and means are provided so that, only when a pulse is present in the first position of the feeder tube that is, at instant D1, does a pulse appear at terminal 703. On each emission of a digit in this way unit 7 is arranged to produce a shifting voltage WS+ which starts from the beginning of each major cycle and lasts for precisely one minor cycle. This voltage WS is used within the unit 7 to produce the marking pulse.

At the cessation of this voltage WS it is also arranged that the pulse pattern in the feeder tube is shifted by one pulse position so that each pulse appears one pulse position earlier. This is achieved by applying the voltage WS which appears at terminal 705 to terminal 54 of the feeder unit so as to open, for one minor cycle, a path for the pattern of pulses which path excludes the one pulse delay in unit 7. The circuit for the pulses in the feeder including the one pulse delay in the circuit 7, comprises connections from the A1 terminal 55 to terminal 700 of unit 7, through the one pulse delay circuit, and then back from terminal 701 to unit 7, to the A2 terminals 56 as described above, but this latter path includes a mixer 16. In addition to this path from terminal 700 to 701 through the one pulse delay circuit, there is also another circuit, omitting the delay, from the output terminal 53, through mixer 16 and thence to its own A2 terminal 56. Pulses can use this short-circuiting path under the control of WS+ applied to the terminal 54 of the feeder. When this path is used the alternative path through the one pulse delay circuit is kept closed under the control of this same voltage WS+. In this way for one minor cycle the contents of the feeder tube pass from the A1 terminal to the A2 terminal without passing through the one pulse delay. The contents of each position therefore appears one pulse earlier. Thus in successive major cycles the pulses, if any, in the successive positions of the feeder tube, starting from the least significant, occur coincident with D1 and are permitted to pass from the feeder circuit to terminal 702 of unit 7 and thence to terminal 100 of the converter. It is then further arranged that on each such operation to transmit a digit, the transmitted digit is erased from the feeder tube.

The contents of the feeder are thus issued to the converter one digit at a time by unit 7, and it is necessary to indicate in some way when the whole of the contents of the feeder have been so issued.

The operation of the digit issuing and shifting control unit 7 includes no means of counting the number of digits sent to the converter. The count is carried out in the converter and, as will be described later, the converter emits a pulse when it has received the last digit. This pulse is identified as the number-end pulse and is sent from converter terminal 102 to terminal 600 of the transfer control unit 6, initiating the transfer to the feeder of the next number in the storage unit.

The last digit received by the converter is either the 35th digit of a group (the 36th digit is left blank, for reasons of electrical design), or an earlier one as specified by the conversion limiting instructions previously received by the converter.

When conversion limiting takes place, the converter, from signals previously received and interpreted by it, counts the binary positions, and when all those containing significant elements have been dealt with sends the number end pulse to the control circuit, before the full 36 positions have been dealt with.

A number-end pulse appearing at the converter terminal 102 and applied to terminal 600 of the transfer control unit 6 initiates the transfer of the succeeding number from storage unit to feeder; the number-end pulse produces a control signal WT+, lasting for one major cycle, at terminal 601 of the transfer control unit 6. Signal WT+ is applied to two gates 17 and 18, also controlled by WC+ and WC— from terminals 804 and 805 of the changeover control unit 8. These gates 17 and 18 control the connection in series of the feeder with storage unit 4 or 3 respectively and also determine which storage unit is connected in series with the feeder, the output of gate 17 being connected to both the input gate 42 and output gate 44 of unit 4, the output of gate 18 being connected to both the input gate 32 and output gate 34 of unit 3. The outputs of gates 17 and 18 are also applied through phase inverting devices 19 and 20 to clear gate terminals 37 and 47 in order to prevent the internal circulation of pulses in the storage units circuits during transfer.

The number-end pulse also causes the feeder to be cleared by applying WT— from terminal 602 of unit 6 to the clear gate 57. As will be seen later the number-end pulse also causes the temporary suspension of the emission of digits from unit 7 to the converter.

When all the sections of the storage unit have been transferred in turn to the feeder, or when all sections that held significant information have been transferred, the converter is caused to produce at terminal 103 a "tube complete" pulse which is fed to terminal 808 of unit 8. This is generated by the number-end counter in the converter. At the same time unit 8 is caused to send a suppression voltage WX1 from terminal 809 of unit 8, through mixer 21, to the terminal 707 so as to inhibit digit emission for the time being. Unit 8 also sends a blocking or suppression signal WB— from the terminal 807 of the changeover unit 8 to terminal 603 of the transfer control unit 6 to prevent further transfers into the feeder tube until after the other storage unit tube has been connected to it.

The latter purpose is achieved by suppressing the waveform appearing at terminal 604 of unit 6 which normally opens the input gate into the feeder tube during transfer. Thus although the completed storage unit tube remains connected to it for the time being, no pulses can flow from the storage unit circuit; should any pulses remain in the storage unit they are therefore erased.

At the appropriate time it is necessary for the unit 8 to make an empty storage unit available, and to initiate changeover of the feeder from an empty storage unit to a full one. The changeover unit 8 which effects the changeover is "made aware" of the fact that the converter has finished with the storage unit tube connected to it, by the "tube complete" pulse produced by the converter at terminal 103 of the converter and applied to terminal 808 of the changeover control unit 8; also when an empty tube has been filled a "tube filled" pulse is received from the terminal 22 of the input circuit and applied to terminal 812 of the changeover control unit 8. When both these signals have been received by unit 8, a changeover pulse causes an interchange of the signals WC+ and WC— which appear at terminals 804 and 805.

These signals control access from the input circuit to storage units 3 and 4 by means respectively of the gates 13 and 14, as described above, and the effect of interchanging the two signals WC+ and WC— is to cause the two gates to change over. In this way each time one storage unit has been emptied by the converter and the other filled the gate 13 or 14 which has been previously held open by one of the WC signals is now closed and the other one is held open ready so that the next $C_h$ signal at terminal 12 will admit the next block of information to the storage unit last emptied by the converter.

For proper operation of the apparatus described it is necessary that the emission of digits from the digit issuing and shifting control unit 7 should be suspended in any of the following cases:

(1) When the converter is not ready.

(2) While a number is in the process of being transferred to the feeder.

(3) While waiting for a changeover when one storage unit has been emptied but the other has not yet been filled.

Considering each of these in turn, the converter signifies that it is ready to receive information from the unloader by means of a "readiness" signal sent from the converter terminal 104 to terminal 706 of the digit issuing and shifting control unit 7. This signal is used in the unit 7 to permit the formation of the suppression waveform WS+, thus allowing the information and marking pulses to be sent to the converter; in the absence of this "readiness" signal this cannot take place.

When a fresh number is being transferred to the feeder on receipt of a numbered pulse a suppression or inhibiting voltage WX2, lasting only for the completion of the transfer, is sent from terminal 605 of the transfer control unit 6, through a mixer 21, to terminal 707 of unit 7. The transmission to the converter is made conditional both on this voltage and on the "readiness" signal applied to terminal 706.

While waiting for the changeover to take place the suppression or inhibition signal WX1 is sent from the changeover control unit 8 terminal 809 and this is mixed in mixer 21 with the suppression signal WX2 from the transfer control unit, terminal 605. Thus the emission of digits from unit 7 is suspended during the whole of the time lasting from the receipt of the last "number-end" pulse (which is coincident with the storage unit changeover pulse) to the completion of the transfer of the first number from the storage unit into the feeder after changeover has taken place. This means an interruption of at least three major cycles (3.4 milliseconds) in the flow of digits to the converter as will be appreciated later.

The foregoing is intended to give a broad indication of the general arrangement of the annex circuits and there will now be described in somewhat more detail the arrangement of the component units.

There are certain other provisions made in the arrangements of Figures 3–5. Thus, a specifiic erasing voltage WE is produced by unit 6, at terminal 606, and is fed to the terminal 708 of unit 7. The emission of this voltage from unit 6 is however controlled by voltage WB+ fed by a connection from terminal 810 of unit 8 to terminal 607 of unit 6. Furthermore to prevent transfer of the contents of a storage device into the feeder whilst a changeover between storage devices is taking place there is a connection from terminal 608 of unit 6 to terminal 811 of unit 8.

In addition to the unit interconnections as described above, clock and timing pulses are fed to these units as necessary. Thus clock pulses, major cycle pulses and D36 pulses produced at terminals 23, 24, 25 are applied to terminals 709, 710, 711 respectively of the digit issuing and shifting control unit 7. The D36 and major cycle pulses are fed also to unit 8, to terminals 813 and 814 of that unit, and major cycle pulses are applied to terminal 609 of unit 6.

Figures 6–11 show in more detail than Figures 3–5, the arrangement of the digit issuing and shifting control unit 7, the control unit 6, the changeover control unit 8, and some of the associated gate circuits. Corresponding elements bear the same reference numbers.

Before proceeding to describe the circuit in more detail it is convenient first to refer to certain circuit devices or elements which are repeatedly employed. One such device is a gate circuit or, for brevity, a gate, similar to the gates 13, 14, 17 and 18 of Figures 3–5. These gates are the equivalent of electronic switches or coincidence units, and are of the type described in an article in "Electronic Engineering," volume 20 (1948), on page 217. As here understood a gate is, briefly, a device having a series of inputs and a single output; an output is produced only when all the inputs are made simultaneously positive. Accordingly there will be a positive output from the gate only for the duration of that input which has the shortest duration. In the drawing the convention is adopted that the signal path for the input (or inputs) of shortest duration is denoted by horizontal lines to a block representing the gate, while the remaining inputs are drawn vertically.

The second device used in the arrangement described is a symmetrical bistable multivibrator circuit. Such a circuit has two stable current conditions, and can be caused to change from one to the other of the two conditions by the application of a positive triggering pulse to one of two control inputs.

A bistable multivibrator is sometimes referred to as a flip-flop and in this specification this name will be used for such units. The various flip-flops employed and hereinafter referred to are shown as having four terminals, "set" terminal S, "reset" terminal R, positive output + and negative output —. All the flip-flops of Figures 6–11, except where specifically stated to the contrary, are assumed to be initially in a "reset" condition in which this output polarity is reversed, brought about by a positive pulse having been applied to the "reset" terminal R. The principal use of the flip-flop circuit is as a means to provide an indication, which can be sustained indefinitely of a voltage change of very brief duration, such as a pulse. The indication can nevertheless be cancelled substantially instantaneously when it has served its purpose.

In describing the circuit arrangement of Figures 6–11 to secure the operation described above it is thought that it will be most advantageous to describe first the digit issuing and shifting control unit 7. It will therefore be assumed that the operation of the apparatus has reached the point where the feeder is full, and digits are to be issued, one at a time, to the converter.

Turning now to Figures 6–11, the operation of feeding to the converter the digits stored in the feeder tube of unit 7 is initiated by a major cycle pulse MD applied to terminal 710. This is applied to a gate 714, controlled by two signals, one of which is the "readiness" signal from the converter ("converter ready") which is applied to terminal 706 and permits the opening of gate 714 when the converter is ready to accept information. The other control signal applied to gate 714 is a negative-going suppression signal from the mixer 21, which ensures that the emission of digits to the converter is prevented either during a transfer of digits from one of the storage devices to the feeder or a changeover between the storage devices as described previously.

The major cycle pulse, after passing through gate 714, is applied to the "S" input terminal of flip-flop 715. The MD pulse thereby makes positive the + terminal of flip-flop 715 and this positive potential is variously used, and in particular is applied to an input of each of two gates 716 and 717. Gate 716 also receives D36 pulses in each minor cycle from terminals 711. Thus, when the D36 pulse following the MD pulse appears it will pass through the now open gate 716. The emergent pulse is used to reset the flip-flop 715, and is therefore applied to the R terminal of that flop-flop, but in order that the flop-flop shall not be reset during existence of the D36 pulse, which would cause that pulse to be mutilated, the pulse after passing through gate 716 also passes through the delay circuit 718 producing one pulse length's delay, included in the path to the R terminal of the flip-flop. Since the MD pulse is itself a D36 pulse, as previously explained, it is also passed through a delay circuit 719 producing one pulse length's delay, before setting the flip-flop 715. If this delay were not present the flip-flop would become set by an MD pulse, and the positive going waveform might open gate 716 in time to let through a mutilated D36 pulse. This would result in the flip-flop becoming set and almost immediately reset. The voltage that thus appears at the + terminal of the flip-flop 715 provides the signal WS+ previously referred to and lasts for one minor cycle, having a repetition frequency of once per major cycle. Signal WS+ is also applied to terminals 703 as a marking pulse to the converter, to indicate that a binary digit may be present.

Signal WS is also applied to the output gate terminals 54 of the feeder 5, thereby to control the output gate 58, in order to extract the pulses from and shift the pulse pattern in the feeder circuit, in the following manner. After the storage device has been connected in series with the feeder for one major cycle a pattern of pulses one minor cycle in length is left circulating in the feeder circuit, as described above. The first pulse position of the pattern appears at the input 51 to the feeder (Figure 5) at time D1, but due to the fact that the storage tube of the feeder is of a length which is equivalent to only 35 pulse intervals, the pulse appears at the A1 terminals of the feeder, i. e. at terminals 55 of unit 5, at time D36. The normal path followed by the pulse pattern is through the additional delay 720 of one pulse period (about 2 microseconds), the amplifier 721, the clocking gate 722 (one input of which is fed with clocking pulses from terminals 709 to re-establish the correct timing of the pulses), the mixer 16, and back to the A2 terminal 56 of the feeder 5. Thus, although the first pulse position appears at terminal 55 at time D36, it leaves the delay unit 720 at D1; likewise the second pulse position appears at terminal 55 at time D1 but leaves unit 720 at D2 and so on.

This circulation continues until the flip-flop 715 is set, and signal WS is applied to gate 717 and to the output gate terminal 54 of unit 5. The pulse pattern now has two possible paths. The first path is from A1 terminal 55, through the delay unit 720, amplifier 721, and to a second input of gate 717. A D1 pulse from terminals 704 is applied to the third input of this gate. Since the first pulse position leaves the delay unit 720 at D1 it also appears at gate 717 at time D1, the second at time D2, etc. Thus if there is a pulse in the first pulse position, it passes through gate 717, through a pulse widening circuit 723, to produce a pulse 500 to 600 microseconds long, which is fed to terminals 702 as an information pulse to the converter. Gate 722 in this first path is closed by a negative suppression voltage derived by applying voltage WS to a mixer 724 and a phase inverter 725. Mixer 724 also receives two other voltages, as will appear hereinafter, which do not affect this operation of the gate by the signal WS. Since signal voltage WS lasts for a minor cycle, the pulse pattern cannot follow this path back to the mixer 16 and so cannot re-enter the feeder tube circuit by this route.

However, the second of the two paths is through gate 58, which is the output gate of the feeder, through terminals 53 and mixer 16 to the A2 terminals 56, and this path is opened by the application of voltage WS to output gate terminals 54 of unit 5 from the beginning of the minor cycle, i. e. from just before D1. Thus the pulse in the second position which arrives at terminals 700 at the time D1 and all the remaining pulses which follow are able to follow this second path through the mixer 16, back to the A2 terminals 56 of the feeder circuit. This path is shorter than the first path by one pulse period and since the feeder tube provides only a delay of 35 positions the pulse originally in the second pulse position arrives at terminals 700 in the next circulation time at time D36. The voltage WS applied to the output gate terminals 54 of feeder 5 persists for one pulse period longer, i. e. until the expiration of the full minor cycle, so that a pulse in the D36 position passes through the output gate 58 and terminals 53 at this time. However, by the time the pulse in position D36 has passed through the delay 720 the gate 722 is also open, for the suppression waveform derived from WS has then ceased. Thus the second position now enters the feeder circuit through mixer 16 at the instant D1 as did the first position at the instant D36 from terminal 53. The pulse previously in the third position arrives at terminals 700 at the instant D1, when output gate 58 of the feeder is closed. It therefore re-enters the feeder circuit through the second path through gate 722 at the instant D2. The other pulses are similarly advanced in their positions in the cycle by one pulse position.

The pulse pattern continues to circulate through the first path, which includes the gate 722. This gate however is closed at instant D36 by the application to it of the D36 pulses from terminals 711 through the mixer 724 and phase inverter 725. As a result the pulse in the D36 position is erased; as will be seen from the foregoing description the pulse in this position is the pulse which was originally in the second position.

The pattern continues to circulate through the first path in this way until the next MD pulse appearing at terminals 710 causes WS to be applied once again to gates 717 and 58. If a pulse exists in the second position of the pulse pattern it will now reach the gate 717 at the same time as D1, and is issued as an information pulse and erased from the circulation in a similar manner and the pattern shifted again; this procedure is repeated until the number-end pulse is received from the converter as previously described with reference to Figures 2–4.

The number-end pulse is applied to terminals 600 of the feeder transfer control unit 6 and is applied through a pulse widening circuit 612 to a gate 613 to which are also applied MD pulses from terminals 609; this allows a single major cycle pulse MD to pass through the gate when a number-end pulse is received. The MD pulse is passed through a mixer 614 to the S terminal of a flip-flop 615 which is thereby set.

The positive output which appears at the terminal of this flip-flop is used as the signal voltage WT referred to above, and is therefore applied to terminals 601.

As described with reference to Figures 2–4, the voltage WT at terminal 601 is applied to the two gates 17 and 18 of which one only will be opened at any time under the control of the changeover control unit 8. The output of the open gate is applied to the input gate and the output gate of the appropriate storage device and through a phase inverting network, either 19 or 20, to the clear gate of the same storage device.

This signal voltage WT is also applied through a delay circuit 616 of one pulse length's delay to three further gates; the first of these is gate 617, to which is applied also MD pulses from terminals 609 thus permitting the next major cycle pulse to pass the gate and reset the flip-flop 615. This output of the flip-flop 615, used as WT will therefore be a pulse having a length of precisely one major cycle.

At the same time, the output of the delay network 616 is also connected to gate 618, the output of which is in turn connected to terminals 604 and thence to the input gate 52 of the feeder tube. A negative-going inhibition voltage WB— from terminal 807 of the changeover control unit 8 is also applied to gate 618 in order to close the gate on the receipt of a changeover pulse, when it is required to clear the feeder and storage tubes as was described with reference to Figures 2–4, but normally at this time gate 618 would be open, so that the tubes are connected in series for the duration of WT.

In connection with the clearing of the storage and feeder tubes at the changeover a third gate 619 is connected to the output of delay unit 616. This gate 619 is under the control of voltage from the changeover control unit 8 and its output is connected through terminals 606 and 708 to the mixer 724 of unit 7, thence through phase inverter 725 to the clocking gate 722, closing that gate and thus preventing any circulation of pulses through the feeder, and erasing any pulses therein.

The negative going output WT— of the flip-flop 615 is applied to terminals 602 and thus to the clear gate of the feeder tube. Voltage WT— is applied also to mixer 21 and then to terminal 707 and gate 714 of unit 7 in order to prevent the emission of digits taking place during transfer.

There will now be described the operation by which the changeover of the two storage units is effected by the changeover and availability control unit 8 and the manner in which the empty storage unit tube is filled by incoming information, and the means whereby the feeding of information pulses to the converter is prevented until the storage unit tube has been filled and the first transfer from storage unit to feeder has taken place.

The changeover control unit 8 makes use of a number of flip-flops which bear references 815, 816, 817 and 818; flip-flop 815, when set, gives a sustained indication of the recipt of a "tube complete" signal received from the converter. Flip-flop 816 is used for producing the changeover voltages WC+ and WC— which are applied to terminals 805, 804 and thus to gates 13 and 14 in the input circuits to the two storage units. Voltages WC+ and WC— are also applied to gates 17 and 18, to determine to which unit the voltage WT+ is applied from terminal 601 of unit 6. Flip-flop 817 is used as a sustained indication of the availability of one or other of the two storage units tubes, and flip-flop 818 gives a sustained indication of a "test successful" signal at terminals 806 and applied to gates 13 and 14 in response to a test signal $C_t$.

It may not be readily apparent how the flip-flop 817, having but two states of stability, can be used to indicate all the possible conditions which can arise with two unloader tubes.

There are, of course, four possible conditions which can arise with two storage tubes, namely:

(i) Both tubes empty
(ii) One tube being emptied, one empty
(iii) One tube full, one tube being emptied
(iv) Both tubes filled Both the converter and the input circuit require to know the condition of the two tubes. The latter must be prevented from allowing further information to pass if there is no tube in which to store it. It follows that condition (i) and (ii) above are the only ones during which the input circuit can permit information to pass and that when condition (iii) is reached the input circuit must be prevented from passing any more information until storage tube has been emptied.

The converter requires to know only that there is one storage tube which has been completely filled and is available for its contents to be transferred to the feeder and converter. Conditions (iii) and (iv) are the two in which this is so, and thus it follows that the desired indication of the availability or readiness of the storage tubes, so far as it concerns the input circuit and the converter, can be given by a flip-flop of which one state indicates condition (i) and (ii) above, and the other state indicates either conditions (iii) or (iv). The fact that one indication is used for both one tube empty and two tubes empty does not result in any loss of identity of the information, since it can be arranged that the first tube to be emptied must be the first tube to be reconnected to the input circuit, as will appear hereinafter. It is convenient to indicate the two conditions of flip-flop 817 as the conditions "tube empty" (i) and (ii) and "tube full" (iii) and (iv).

It will be assumed initially that all the flip-flops 815 to 818 are reset. Flip-flop 817 being reset indicates the "tube full" condition, when there is no storage tube available, i. e. the input circuit cannot send information to the storage unit and that if a test is carried out it must result in an unreadiness pulse $D_n$ being sent to the input circuit, as explained earlier. This is achieved in the following manner.

The negative going output WF— of flip-flop 817 is connected to one terminal of gate 819. The availability test signal $C_t$ is connected to terminal 890 and applied through a delay 820 of one pulse length to a second terminal of gate 819. As flip-flop 817 is in the reset state, WF— is at a positive potential and hence gate 819 is opened and permits a D36 pulse from terminals 813, which is applied to the third terminal of the gate, to pass through to terminal 801 as a $D_q$ pulse to the input circuit.

The "tube complete" pulse is received from the converter at the same time as the last "number-end" pulse. The "tube complete" pulse is applied to terminals 808, and, in a similar manner to the "number-end" pulse, is widened by a pulse widening circuit 821 and applied to gate 822. MD pulses from terminals 814 are also applied to gate 822, so that an MD pulse, which can be designated, as the first MD pulse, passes the gate and sets flip-flop 815. Flip-flop 615 in unit 6 is set at the same time as flip-flop 815; the last "number-end" pulse from terminals 600 after being widened is applied to a gate 613 as described previously, thus permitting the same MD pulse from terminals 19 to set the flip-flop 615.

The positive output of flip-flop 815 is applied through a delay 823 of one pulse length to one input of gate 824.

In unit 6, the second MD pulse arriving at terminals 699 passes through the gate 617 now opened by WT+, and reaches and resets flip-flop 615 as before. In unit 8 this MD pulse cannot pass through gate 824; this gate is at this time closed by a negative waveform derived from the delayed positive output WT+ of flip-flop 615 applied to it through terminals 603, 811 and phase inverter 825. However, during the major cycle in which flip-flop 615 was set, gate 619 was opened by the positive waveforms from flip-flops 615 and 815 applied to its terminals, and gate 618 closed by the negative output of flip-flop 815 being applied to one of its terminals, thus erasing any contents of the feeder and storage tube which has just been emptied.

With the resetting of flip-flop 615 the control voltages applied to gate 824 are now positive, and the third MD pulse applied to terminal 814 now passes through gate 824. This pulse is applied to flip-flop 816, which is, in effect, a scale-of-two counter, whereby, on the application of successive pulses from gate 824, the flip-flop is alternatively set and reset.

The flip-flop 816 controls the two pairs of gates which effect the changeover of the two storage tubes; these gates are respectively 17 and 18 which determine to which storage tube the transfer voltage WT+ is applied from the transfer control unit, and gates 13 and 14 which determine to which storage tube received information from the input circuit is passed. These pairs of gates are differentially operated, gates 13 and 17 being connected to the positive terminal of flip-flop 816 and gates 14 and 18 to the negative terminal of the flip-flop.

The pulses from gate 824 also reset flip-flop 815 and sets flip-flop 615, the latter terminals 832 and 620 and flip-flop 615 initiates the first transfer from the new storage tube to which the feeder is now connected, flip-flop 615 being reset by the fourth MD pulse applied to terminals 609.

It is to be noted at this point that the time taken from th last "number-end" pulse to the completion of this first transfer has been three major cycles. During this time the negative outputs of flip-flops 615 and 815 have been applied through the mixer 21 and terminals 707 as a suppression voltage WX to gate 714, in unit 7, thus suspending the emission of digits to the converter for three major cycles; the output of flip-flop 815 passes through a delay network 826 of one pulse period delay. Delay network 826 is included to prevent a positive pulse, due to the cross-over of the waveforms from flip-flops 615 and 815 on the third MD pulse which sets 615 and resets 815, from being applied to gate 714. Such a pulse would occur approximately one pulse length after the MD pulse and would coincide with the MD pulse from terminals 710, which is delayed for one pulse length by delay network 719.

In addition to initiating changeover and transfer, the pulse from gate 824 also sets flip-flop 817 through delay network 827. This setting of flip-flop 817 indicates that an empty storage tube is now available. The positive output of flip-flop 817 is applied to a gate 828, to which are applied also D36 pulses from terminal 813, and the $C_t$ order from terminal 800, after being delayed by delay 820. Gates 819 and 828 being thus connected respectively to the + and — terminals of flip-flop 817 are differentially operated. Hence when the next availability test signal $C_t$ is sent to terminals 800, gate 828 opens and gate 819 closes, allowing the next D36 pulse from terminals 813 to pass through the open gate. This pulse can be transmitted to the input circuit as an "end pulse," and indicates thereto that information may be passed into the storage tube. The pulse from gate 824, used to set flip-flop 817, is derived from an MD pulse, which is itself a D36 pulse, and so the delay network 827 of one pulse length delay is included in order to prevent the possibility of a mutilated D36 pulse being emitted from gate 828.

As stated earlier, when the flip-flop 817 is set it is an indication that an empty storage tube is available. When this is so then a changeover of this tube, to connect it to the converter, must be inhibited until information has been put into it. In order to achieve this, the negative output of flip-flop 817 is applied also as a suppression waveform to gate 824.

The pulse from gate 828 also sets flip-flop 818, thus indicating that a successful test order has been carried out. The positive output of flip-flop 818 is applied to gates 13 and 14. As explained with reference to Figures 2–4 the successful test is normally followed immediately by a signal $C_h$ which appears at terminals 803 and which is applied to gates 13 and 14. According to the setting of the flip-flop 816 either gate 13 or 14 is opened, thus permitting the train of pulses applied to terminals 1, to pass through mixer 26 or 27 (Fig. 4) to the A1, A2 terminals of storage unit 3 or 4.

The completion of the filling of the storage tube is indicated by a "tube filled" pulse applied to terminals 812. The "tube filled" pulse is applied to gate 829 which is under the control of the signal $C_h$ applied through the delay network 830 and the positive output of flip-flop 818.

The output of gate 829 can be transmitted to the input circuit via mixer 833 and terminal 802 as an "end" pulse to terminate the waveform $C_h$. Delay network 830 is, therefore, introduced to prevent a mutilated pulse output from gate 829. The output of gate 829 is also applied through a delay network 831 to the reset terminals of flip-flops 817 and 818. Flip-flop 817 being reset indicates that there is no longer an empty tube available, and ensures that, if a test signal is received a $D_q$ signal will be returned, as previously described. It also removes the inhibition waveform from the gate 824 so that, as soon as the converter sends the next "tube complete" signal, the changeover of storage tubes may take place. Resetting flip-flop 818 cancels the test successful signal.

The block schematic of Fig. 12 shows the circuits used between the feeder and the compositor. These are the converter and the compositor. Each of these comprises a number of circuits all of which can be considered individually and the block schematic of Fig. 12 shows their arrangement. It will be remembered that received information is fed out via the feeder which can store one number, that is, up to 35 binary elements. The feeder is indicated at the top left hand side of Fig. 12. Besides this one connection to the annex circuits there is another lead over which marker or step pulses are fed from the annex to the converter. This lead is shown at 201, and is connected to terminal 101 of the annex circuits. Four control leads, 202—205A pass from the converter and the compositor to the annex. The purpose of these leads will become clear in the following general description.

The information handled is in the form of binary elements, the presence or absence of a pulse at any time position denoting respectively the presence or absence of an element, and the information passed is in the form of first a composition instruction and then numerical data, these two kinds of information alternating. The composition instruction and the numerical data each take a time represented by 36 binary element positions (up to 35 digits with one blank digital space between numbers). The composition instruction is related to the number which follows it and it is, therefore, necessary to register the information which it contains for subsequent use. Thus, a distributor is required to route the information from the feeder to the appropriate section of the converter. Marking pulses fed over lead 201 from terminal 101 control the operation of the distributor. This, the distributor, is schematically shown as an inlet switch 205.

A general outline of a typical operation will now be followed through and it will be assumed that a composition instruction is already contained within the feeder. With the converter in its rest condition, the sequence control 206 sends a converter ready signal over lead 205A to terminal 104 of the annex to indicate that the converter is ready to receive information. Also in the rest condition the inlet switch 205 is arranged to pass information to the decoder 207.

The marking pulse is sent from terminal 703 of the digit insuring and shift control unit 7 in the annex and the marking pulse counter 208 in the converter records one pulse received. Concurrently with the marking pulse the first information pulse is passed from the feeder 5, through the digit insuring and shift control unit, to the decoder 207. Further marking and information pulses are received until at the 36th marking pulse the marking pulse counter 208 is returned to its rest condition. When the marking pulse counter returns to its rest position a signal is sent to the conversion limiter 209 and this transmits over lead 202 a "number end" pulse to the lead 102 of the annex. Receipt of the "number end" pulse at the annex indicates that the contents of the feeder have been registered and the next set of information can be transmitted.

Over lead 210 a pulse is sent from the conversion limiter 209 to the inlet switch 205, changing this over so that the next item of information will be passed to the arithmetic unit comprising the progressor 211, the doubler 212 and the aggregator 213. The annex circuit on receipt of the "number end" pulse passes the numerical data to the feeder. Another marking pulse is sent over lead 201 and over lead 214 this pulse starts the operation of the doubler 212. Information pulses are fed from the feeder 5 and digit issuing and shift control unit 7 via lead 215 to the aggregator. Further marking and information pulses are received and all pass to the arithmetic unit. The full operation of this unit has been described in application Serial No. 456,509, filed September 16, 1954. The unit produces the decimal or sterling equivalent of the binary information received. One element in the composition instruction is used to show that the number which follows is either decimal or sterling. In accordance with the appropriate section of the composition instruction, the decoder 207 controls, over the lead 216, the operation of the progressor and aggregator so that the correct conversion process occurs.

It has already been stated that the feeder has a capacity of 36 binary elements, but only 35 of these are used for passing information to the converter. However, in practice, many items of numerical data will not even require 35 binary elements. In order to save time, therefore, the conversion process is stopped when it is known that there are no further significant elements. For instance, if it is known that a particular printed result will only require one decimal digit only the four least significant binary digits are needed to pass this result. The arithmetic unit requires one other binary element for a reason made clear elsewhere, so that in all only five binary element positions are required for a one decimal digit number to be printed. The composition instruction which precedes the numerical data contains information as to the number of element positions occupied by the number. The marking pulse counter 208 counts the number of elements received by the converter so that the conversion process may be easily brought to a halt. The conversion limiter 209 accomplishes this. It responds to the correct number of elements being received and transmits a "number end" pulse over lead 202. The "number end" pulse stops further information being fed and also changes over the inlet switch 205.

At this stage the composition instruction is registered on the decoder 207 and the numerical result is registered by the aggregator 213. In order to free these units immediately for further use the information is re-registered in the compositor. During the re-registering, the sequence control 206, under control of the conversion limiter 209 over lead 217, passes the "converter un-ready" signal to the annex circuits over lead 204.

The circuits of the compositor which are concerned with the receipt of information from the converter are the composition control 218, the composition distributor 219, the coder 220 and the register 221. The sequence control 206 takes charge of the passing of the information from the converter to the compositor. With the composition distributor in its rest position indicated to the sequence control over lead 222, the pulse from the conversion limiter over lead 217 causes the sequence control to be set to the transfer operating position. In this position the transfer signal is sent over lead 223 to allow the transfer of the contents of the decoder and aggregator to pass to the compositor. From the composition instruction, the decoder will have determined various particulars regarding the succeeding numerical data, such as tabulation information, and the position of the decimal point in the case of a number to be expressed in decimal notation.

This controlling information passes to the composition control 218; other information in the decoder may need to be recorded and this, therefore, is passed to the coder 220 and to the register 221. The numerical information from the aggregator is passed via the coder to the register. The composition control 218 ensures that the composition distributor 219 is set up in accordance with the particular requirements of the information to be recorded. The coder 220 is a translation network used to translate the information to be recorded into a particular code which is used for the recording. When this operation is completed the sequence control sends a restore signal over lead 224, re-setting the arithmetic unit to its rest position ready for it to be used again. The sequence control 206 now restores to its normal rest position and the "ready" signal is sent over lead 205 to the annex circuit allowing the next items of information to be passed via the feeder to the converter.

The compositor is now ready to proceed with the recording of the information stored in the register. At the same time that the sequence control sent the "restore" signal to the arithmetic unit, a signal was also sent from the sequence control over lead 225 to start a time scale 226. The time scale provides a time basis for an 8-unit code; one unit period is used for the start element, five for the character intelligence and 2 for the stop elements. The time scale in co-operation with the composition distributor controls the passage of the information from the register to the code transmitter 227 in the particular temporal relationship which is required. The code transmitter 227 receives the elements in turn and causes a record to be made on the magnetic tape in the associated magnetic storage unit, a tape machine such as 228.

One tape machine such as 228 may not be sufficient to hold all the information passed in one reconversion operation. Hence, a number of tape machines are provided (three as shown in the figure) and the information is passed to these in turn under control of the tape machine distributor 229. The machines have practically identical capacity for recording information so that the change over from one machine to another may be affected to a time basis. For this purpose tape timing mechanisms are incorporated in the tape machines themselves for controlling the tape machine distributor. The tape timer of the first machine is started as soon as the first tape machine is taken into use. The arrangement is such that when the allotted time is finished the recording is allowed to proceed until the contents of the annex tube in use at that time have all been recorded after which the tape machine distributor switches over to the next machine and a new timing sequence is begun.

For recording results in printed form it is undesirable to print a number of zeros before the significant digits. It would be better for these to be replaced by spaces. This is achieved by transferring all zeros which are recoded in the register 221 as spaces to the code transmitter. All information passed between the register and transmitter is scanned by the output reader 231. When this reader first detects a character other than a space, a signal is returned to the register over lead 232, and all further space signals in the register are then replaced by zeros.

When the recording is complete the composition distributor returns to its rest position. If before this happens the next items of composition instruction and numerical data have already been passed to the converter, the sequence control will have sent a "converter un-ready" signal over the lead 204. When the composition distributor reaches its rest position, the sequence control proceeds with the transfer of information from the converter to the compositor as previously described.

The sequence control cannot effect transfer of information from the converter to the compositor while the tape machine distributor is changing over. This control is exercised over lead 233.

As already stated above the feeder may be fed from either one of two annex storage tubes, the capacity of each of which is eight composition instructions and eight items of numerical data. The converter sends to the annex circuits a "number end" signal when it is necessary for a change-over to be effected from one annex tube to the other. Each number end pulse sent from the conversion limiter is also taken over lead 234 to the number counter 235. This latter counter is a simple 16-way device which sends over lead 203 to terminal 103 of the annex circuits a signal to the annex circuits when 16 number end pulses have been received. This latter signal causes the feeder to be fed from the other annex tube. Under some circumstances an annex tube is not filled completely. An indication is then given in the last composition instruction contained in that annex that that is, in fact, the last instruction. This intelligence is detected by the decoder which then controls the number counter over lead 236 to send the annex change-over signal after the following numerical data has been received.

The information recorded on the magnetic tape is subsequently transmitted to a teleprinter which prints it in a properly set-out form, including any tables that may be included.

The entire operation of the information handling equipment may be summarized by reference to Fig. 34 which shows a block diagram of the various elements. The information to be recorded is received in pulse form from a sending apparatus and is applied to the input circuit over the incoming channel IC. The information comprises a sequence of pulses representing numbers in binary form, the numbers being aranged in blocks, there being 36 pulse positions for each number and 16 numbers in a block, making 576 pulse positions for one block of numbers. The input circuit is controlled by various pulses from the pulse sources which are shown in Fig. 2. By means of gates 13 and 14 alternate blocks of numbers are fed into the high speed recording devices 3 and 4 each of which is adapted to receive an entire block of 16 numbers. These gates are controlled by the storage device, changeover and, availability control unit 8. As soon as one of the high speed storage devices is filled with a block of numbers the gates 13 and 14 switch the incoming signals to the other storage device and when both are filled the sending apparatus is prevented from sending signals until such time as one of the storage devices 3 and 4 is again empty.

The storage devices 3 and 4 are alternately connected to the feeder 5 which is able to store one number of 16 pulse positions. The connection is controlled by gates 18 and 17 which are controlled by the storage device to feeder transfer control unit. Each of the high speed storage devices 3 and 4 are arranged so that the block of numbers stored therein will continually circulate and as it circulates one number at a time is fed into a feeder as soon as the feeder can accommodate it. This is controlled by the storage device to feeder transfer control unit 6.

The feeder 5 in turn discharges the number contained therein into the converter shown in Fig. 12, but must do so at a greatly reduced speed. This is accomplished by causing the number of 16 pulse positions stored in the feeder 5 to circulate within the feeder, the value of one pulse position being transmitted each time a complete cycle is made, until all of the 16 pulse positions have been fed into the converter. The feeding from the feeder 5 into the converter is accomplished through the digit issuing and shift control unit 7 which controls the recirculating and is in turn controlled by the storage device to feeder transfer control unit 6.

As soon as a pulse leaves feeder 5 for the converter, a particular pulse position in the feeder is left vacant and when all the pulse positions are vacant the feeder is ready to receive another number from one of the high speed devices 3 or 4.

The converter receives a complete binary number of 16 or less pulse positions and converts it into another form of presentation, for example, sterling. If there are less than the full component of 16 pulse positions the conversion is stopped at the proper time.

The converter feeds the resultant number into a compositor (also shown in Fig. 12) where the number is translated into an 8-unit code and registered for subsequent transferrence to a magnetic storage unit. In transferring to the magnetic storage unit, zeros preceding the first "one" are not transmitted. The pulse units are read off and when the first "one" appears, a signal causes the register in the compositor to transmit "zeros" for all the spaces to follow. There are a plurality of the magnetic storage units, and a distributor is provided in the compositor to feed the information to successive storage units as each becomes filled.

With this general outline of the conversion and composition process in mind, attention will now be turned to the detailed circuits which are concerned. Each of these is described in turn.

*Step pulse counter*

(See Fig. 13)

The step pulse counter is a 36-position counting circuit which is used also as a distributor. The circuit uses four 10-point cold cathode multi-gap tubes, SPA, SPB, SPC and SPD, nine cathodes of each being used for counting purposes and the remaining cathodes providing the rest positions for the glow discharge.

When the H. T. is switched on, a relay device (not shown), is used to apply momentarily a negative potential to the reset leads (which are shown, e. g. connected to the circuit of cathode 0 of tube SPB), causing the glow in the tubes to be on cathodes, 1, 0, 0, 0 of tubes SPA . . . SPD respectively. In this position rectifiers W204—212 are biassed positively from tubes SPB . . . SPD so that the cold cathode tube gate GSA will be opened by a triggering potential applied over W213 rectifier due to the potential biasses in dectifiers W204, 207 and 212. The remaining tube gates GSB, GSC and GSD will remain closed because circuits to ground are available over rectifiers W201—203.

The bias potential A derived as shown from the H. T. supply, is applied to each of the multi-gap tube transfer electrode leads over rectifiers W221-4 respectively.

When each binary element of information in the feeder is passed to the converter, a positive step pulse is applied to the grid of valve V1, causing a negative pulse to appear at the anode. This negative pulse is fed to all the gate tubes as shown at P(—) but, since GSA is the only one which is conducting, the only multi-cathode tube to be influenced is SPA which steps its glow from cathode 1 to 2. Further step pulses are received, each causes SPA to take one step. When the SPA discharge reaches cathode 9, gate tube GSB will be struck via rectifier W215 due to the positive potential on SPA cathode 9. Hence when the next negative pulse is applied to the gate tubes, both SPA and SPB tubes will take one step. The removal of the bias from rectifier W214 by cathode 0 of tube SPB ceasing to conduct, extinguishes tube GSA but GSB remains fired under control of the positive biasses on rectifiers W203, 209 and 210. The step pulses now cause tube SPB alone to step until it reaches cathode 9 when tube GSC is struck by the potential across resistance circuit of this cathode being applied to the trigger electrode of tube GSC over rectifier W217. The next pulse steps SPB to cathode 0 and SPC to cathode 1. In a manner similar to that described above, tube SPC and then SPD are caused to step. The 36th pulse steps SPD to cathode 0 and SPA to cathode 1, i. e. back to the starting condition. No further step pulses are received from the annex circuit for that particular item of information.

In dealing with numerical data it is not always necessary to receive a complete number. Under these circumstances, after the number end signal has been transmitted by the conversion limiter, no further step pulses are received. To reset the step pulse counter to its starting position, a negative pulse, generated from the number end pulse is applied to the reset leads so that the step pulse counter will be ready to count the next train of step pulses.

Leads from cathodes 1–9 of tubes SPA, SPB and SPC, and 1–8 of tube SPD, i. e. 35 cathodes, are taken to the decoder circuit. No lead is required from cathode 9 of tube SPD for, as mentioned in the general description, the 36th binary element position in a number is always left blank.

Leads RL are taken from cathodes 5 and 8 of the tube SPA, cathodes 2, 6 and 9 of tube SPB, cathode 7 of tube SPC, and cathode 9 of tube SPD to the conversion limiter so that the conversion process can be stopped according to the number of positions required for recording a result. Four binary element positions are required for each decimal digit to be recorded and, as has been mentioned, the converter arithmetic unit needs one extra initial element position. Hence these interconnections between the step pulse counter and the conversion limiter enable recognition to be achieved of 1–5, 7 and 10 decimal digit numbers to be recorded.

*Inlet switch*

(See Fig. 14)

The inlet switch is used to direct the intelligence fed out from the feeder either to the decoder or to the aggregator according to whether the intelligence is a composition instruction or numerical data.

Initially, when the H. T. is switched on, it is arranged that a negative potential is applied to the reset lead causing tube ISC to strike and tube ISN to be extinguished, these tubes being connected as a flip-flop pair. Thus both rectifier W225 and W226 will be biassed positively by the cathode potential of tube LSC. The information from the feeder is supplied via amplifier AIF on the M and S leads; the amplifier is so arranged that the presence of a binary element is indicated by the M lead at positive potential and the S lead at earth and in the absence of a binary element the M lead is at earth and the S lead is positive. With ISC struck the leads to the decoder will be at a positive potential or at earth according to the state of the leads from the outlet feeder. When ISC is extinguished the leads to the decoder are at earth potential. Therefore any positive potential appearing at rectifier W227 or W228 is presented with a low resistance path to earth over rectifier W225 or W226. The potential on the lead to the aggregator is not dependent upon the condition of the binary pair. As will be seen, the doubler tube in the arithmetic unit of the converter cannot step until tube ISN strikes so that the arithmetic unit cannot operate even though a potential on the M lead is applied to the aggregator.

The first numbers from the feeder will be a composition instruction which, due to the setting of the binary tube pair, will be fed to the decoder. At the end of this number the conversion limiter, on operating, generates a number end pulse which is received on the common triggering lead causing tube ISN to strike. ISN, on firing, causes a negative-going pulse to be passed via the inter-anode condenser C200, which in turn causes tube ISC to be extinguished. Rectifier W229 is now biassed positively due to the potential on the cathode of ISN and, since ISN is extinguished, the bias is removed from rectifiers W225 and W226. The information leads to the decoder are both at earth potential so that the numerical data "long number" which follows will not change the setting of the decoder.

The next step pulse to arrive, namely the first step pulse in synchronism with numerical data, causes rectifier W230 to be biassed positively for the duration of the pulse and this, in conjunction with the positive bias on rectifier W229 gives a positive pulse on the start lead to the doubler start tube. The conversion process then proceeds as described in application Serial No. 197,206, entitled "Electronic Notation Converting Circuits," filed November 24, 1950, now abandoned, each step pulse causing the start tube to be re-operated.

The next number end pulse the conversion limiter strikes tube ISC and extinguishes tube ISN and the operation described is repeated. Whilst tube ISN is struck, a potential is applied to the lead to the sequence control which, as will later be described, enables the converter un-ready signal to be given so preventing further information being applied to the M and S leads until the previous information passed to the converter has been transferred to the compositor.

*Number counter*

(See Fig. 15)

The number counter is the unit used to count the number end pulses so that, when it is known that the contents of one annex tube, i. e. 16 numbers, have been removed into the converter and compositor, the input circuit can switch over to the other annex tube of the pair enabling the one which has been used to be re-filled with new intelligence.

The counter consists essentially of two gas-filled cold cathode multi-gap glow discharge tubes NCA and NCB The operation of the circuit is similar to that of the step pulse counter. Number end pulses are fed to the pentode valve V2 which generates negative going pulses at its anode, which latter pulses are applied via gates tubes GNAm GNB to the multi-gap counting tubes.

Initially when the H. T. is switched on, the reset device applies negative potentials to the reset leads which causes the glow discharge to appear on cathode 0 and 8 of tubes NCA and NCB respectively. The positive potentials on cathode 8 of tube NCB is applied to the trigger electrode of tube GNA via rectifier W233, opening that gate and the positive potential on cathode 0 of tube NCA similarly opens tube gate GNB via rectifier W235.

When a number end pulse from the conversion limiter is received at the grid of V2, a negative pulse generated by V2 is applied to the cathodes of both tubes GNA and GNB. These tubes therefore conduct for the duration of the applied pulse and negative going pulses are fed via condensers C201 and C202 to the commoned transfer electrodes of tubes NCA and NCB. There is a standing bias provided at the points A so that both NCA and NCB make one step. The gating tubes GNA and GNB now remain open due to the positive potential from cathode 9 of tube NCB being applied to tube GNA via rectifier W232 and to tube GNB via rectifier W238. The next number end pulse steps tube NCA discharge to cathode 2 and NCB to cathode 0; GNA remains open due to the potential from cathode 0 of tube NCB via rectifier W231 but GNB is now closed.

Further number end pulses cause NCA to step its glow discharge one cathode for each pulse. When NCA steps to cathode 8, GNB is reopened via rectifier 237; GNA remains open via rectifier 231. The next number end pulses steps the discharge in tube NCA to cathode 9 and in tube NCB to cathode 1. Both gates remain open controlled by the potential on NCA cathode 9 applied over rectifiers W234 and W238 so that the following number end pulses steps NCA to cathode 0 and NCB to cathode 2. The potential from NCA cathode 0 keeps GNB open via rectifier W235 but GNA is now closed so that the next number end pulse steps NCB only. The 15th number end pulse, counting from the beginning of the operation, steps NCB to cathode 7, so giving a positive bias to rectifier W239. When the 16th number end pulse is received rectifier W240 is also biased positively (as it is by each number end pulse) so that a positive pulse is produced on the annex changeover lead. The 16th number end pulse also steps NCB to cathode 8 and the number counter is now back at its starting position and is ready to count a further set of number end pulses in connection with the intelligence contained within the next annex tube to be connected to the feeder.

Occasionally it will be necessary to feed out from an annex tube when there has been insufficient data to fill the tube, i. e. less than 16 numbers. In these circumstances an indication is given in the composition instruction for the last numerical data item in the tube. Since there will no longer be 16 number end pulses to step the number counter through a full cycle of movement, it is necessary to apply a reset signal and also, since the number counter will not step to cathode 7 of tube NCB, an annex changeover pulse must be produced by other means. It has to be remembered that the annex changeover pulse must be given at the time position when there is a number end pulse at the end of a numerical data long number. It will be shown later that one section of the decoder is used to denote that the long number to follow is the last in the particular annex tube. Both the reset signal and the annex changeover pulse are therefore produced from the decoder when it is known that an annex tube has not been completely filled.

*Decoder*

(See Fig. 16)

The decoder is used to register the composition instruction. Its main constituents are 35 flip-flop pairs of discharge tubes, D1M, D1S; D2M, D2S; D35M, D35S. Since use is made of flip-flop pairs there is no necessity to have any resetting arrangements for intelligence previously registered is replaced by the act of registering new intelligence. There are 35 binary element positions available to pass a composition instruction although all of these may not be required. There is one flip-flop tube pair provided for each element position and each pair is associated with the multi-gap tube cathode of the step pulse counter which corresponds to the position of the element in the number, e. g. the first element position is associated with cathode 1 of tube SPA, the second with cathode 2 of tube SPA and the thirty-fifth with cathode 8 of tube SPD.

When a composition instruction is being received, the

M and S leads will be at positive and earth potential respectively or vice versa. The information is passed forward from the inlet switch over these leads concurrently with the receipt of the step pulses. To illustrate the operation of the circuit it will be assumed that in the composition instruction there is a positive potential on the M lead for the first element position, a positive potential on the S lead for the second element position and a positive potential on the M lead for the thirty-fifth element position. In each of these cases the other lead is at earth potential.

Before the first step pulse is received the step pulse counter provides potential from cathode 1 of tube SPA, to bias positively rectifiers W241 and W242. Paths are available from rectifiers W245–6, 249 and 250 to earth via the step pulse counter. When the first step pulse is received both rectifiers W253 and W254 are biassed positively and, in this example, the M lead also is at a positive potential. Thus a positive pulse is supplied to rectifiers W243, 247 and 251 biassing them positively, but not to rectifiers W244, 248 and 252. As a result of rectifier W241 being biassed positively and W245 and 249 not being so biassed a positive pulse is applied to the trigger of tube D1M. This causes it to strike if D1S was struck previously or it leaves D1M struck if it had been previously conducting. No other pair of tubes is affected. The step pulse which causes D1M to strike also steps the step pulse counter to cathode 2 of tube SPA so that now rectifiers W245 and 246 are biassed positively. The rectifiers W241–2–9 and 250 are all provided with paths to earth via the appropriate cathode circuits of the step pulse counter.

On receipt of the second step pulse, the S lead is at a positive potential so that a positive pulse appears at the trigger electrode of tube D2S causing this tube to strike if it is not already conducting. Subsequent step pulses set the intermediate flip-flop pairs as required under control of the M and S leads. The 34th step pulse steps the step pulse counter to cathode 8 of tube SPD so that rectifiers W249 and 250 have a positive bias. With the arrival of the 35th step pulse the M lead is positive and, in consequence, tube D35M is struck. The decoder is now set in accordance with the received composition instruction.

As explained previously, at the end of the composition instruction number the inlet switch changes over so that during the numerical data number both the M and S leads will be held at earth potential. Thus the decoder flip-flop pairs will not be affected by the binary element pulses making up the numerical data.

*Arithmetic unit*

(See Figs. 17 and 18)

Fig. 17 shows a block schematic of the arithmetic unit. Such equipment as has already been mentioned, has been previously described in application Ser. No. 197,206. A brief outline of the purpose and operation of the unit will now be given.

The circuit is required to produce the decimal or sterling equivalent of a pulse train presented to it in binary code form. The fundamental part of the circuit is the so-called doubler 237 which is a pulse generator arranged to produce in successive cycles trains of pulses which represent numbers which increase in geometric progression i. e. trains of pulses representing 1, 2, 4, 8. . . . All of these pulses are fed to the progresser 238 (or accumulator as it is termed in the above application) wherein their total is registered, say in decimal form, indications being given of the units tens . . . digits. The pulses are also fed via a gate 239 to an aggregator circuit 240. If this gate is open then the aggregator, which has an identical circuit to the progresser, will also record the total of pulses generated by the doubler. However the gate is controlled by the number whose notation is to be converted so that the presence of a pulse representing binary digit 1 in a number opens the gate whilst it remains closed when the binary digit is 0.

The pulse representing the number to be converted are presented to the gate 239 in turn with the lowest significant binary digit pulse position first. If a pulse is present the gate is opened. Thereafter the remainder of the pulse positions in order are fed to the gate in synchronism with the cycles of operation of the doubler. Consider the conversion of a binary number 1011 during four cycles of the doubler.

The operation is as follows.

| Cycle | Doubler Pulse Trains, Numbers of Pulses | Pulse to Progresser | Binary Digits | Gate | Pulse to Aggregator |
|---|---|---|---|---|---|
| 1 | 1 | 1 | 1 | Open | 1 |
| 2 | 2 | 2 | 1 | do | 2 |
| 3 | 4 | 4 | 0 | Closed | 0 |
| 4 | 8 | 8 | 1 | Open | 8 |
|  |  | ¹ 15 |  |  | ¹ 11 |

¹ Total.

Eleven pulses, giving the decimal equivalent of the binary number 1011, are seen to be passed to the aggregator. An indication can be given from the aggregator of the result. For instance the different order compartments of both the progresser and the aggregator may each comprise a ten-gap gas-filled glow discharge tube. Hence the position of the glow discharges in the aggregator tubes is simply indicated by the conducting state of the appropriate cathodes which gives rise to an indicating potential at the cathode developed across the cathode resistance. Such cathode potentials can be used for marking terminals corresponding to individual cathodes. A similar procedure is followed when counting rings of ten individual tubes are used instead of multi-gap tubes for each of the different digital orders.

In the embodiment being described of the present invention the pregresser and aggregator use individual tube counting rings rather than multi-gap tubes. However in order to cope with conversion of binary numbers both to decimal and to sterling form the least significant and third significant order compartments in both the pregressor and aggregator contain respectively provision for rings of twelve and of two as well as rings of ten. The reason for this arrangement will now be explained.

A decimal number is one in which each digital position has the radix 10. A sterling value is merely a numerical expression in which the least significant digit (pence) has a radix 12, the next (units shillings) has a radix 10, the next (ten shillings) has a radix 2, and the remaining digits (pounds) each have a radix 10. If A is the least significant position, B the next higher, etc., the radices are as follows:

|  | A | B | C | D | All Higher Positions |
|---|---|---|---|---|---|
| Decimal | 10 | 10 | 10 | 10 | 10 |
| Sterling | 12 | 10 | 2 | 10 | 10 |

From this it can be seen that the only variations are for positions A and C.

Order positions A and C are those for which the rings-of-ten and -twelve and the rings-of-ten and -two respectively are provided. A simple switching arrangement is necessary to change over from the decimal to the sterling conversion process and this is controlled by one element in the composition instruction. For the purposes of illustration it will be assumed that the third element position in the composition instruction is reviewed by the decoder to establish whether the following number is to be in sterling or decimal notation. Furthermore it will be assumed that a pulse in this position, i. e. a "mark," passed from the inlet switch to the decoder, represents a sterling number to follow.

Fig. 18 shows the appropriate tubes D3M and D3S isolated from the remainder of the decoder and connected for example, to the ring of ten/twelve provided for the "A" order position in the aggregator. The same pair of decoder tubes also controls the operation of the corresponding "A" order ring in the progressor in an identical way and of the "C" order ten" two rings in the progresser and aggregator in a similar way to be explained later.

The ring of twelve individual tubes A1 . . . A12 is shown in schematic form only. Such counting rings are well known. In this particular one A1–A12 is a ring counter composed of trigger tubes. In the rest condition A12 is struck, the other tubes being extinguished. The circuit arrangement is such that each tube is used to prime the next in sequence, so that when pulses are applied to the circuit A1 strike, so extinguishing A12; then A2 strikes, extinguishing A1, etc.

If the number which follows the composition instruction is decimal, tube D3S is struck due to the potential on the S lead biassing rectifier W157 positively and by the step pulse counter pulse biassing rectifier W159 positively, thereby forwarding a triggering pulse to the tube and D3M is extinguished, whereas, if the number which follows is in sterling, D3S is extinguished and D3M is struck.

For a decimal conversion rectifier W151 is biassed positively from the cathode of tube D3S and rectifier W152 is at earth potential. When the aggregator has stopped so that A9 is struck, both rectifiers W153 and 154 are biassed positively; these biasses in conjunction with those on W151 and M2 cause A12 to be primed via rectifier W155. A10 is not primed. Thus the next pulse to be applied causes A12 to strike instead of A10. Tubes A10 and A11 have been cut out of the counting arrangement, the counter behaving as if it were a scale-of-10.

In a sterling conversion rectifier W151 is at earth potential and W152 is biassed positively by reason of the cathode potentials of D3S. When the counter reaches A9, and W153 and W154 are biassed positively again, tube A10 is primed and not A12, and the next pulse causes the counter to step to A10 and the following one to A11. A12 is now primed via rectifier W156 so that the next step is to A12 and the counter has performed as a scale-of-12. W155 and W156 are blocking rectifiers to prevent interaction between the priming sources of tube A12.

The counter used for the "C" order position is similar to that for the A digital position but requires ten trigger tubes only, A1–A10. Furthermore, instead of the cathode of A9 co-operating with the decimal/sterling decoder tubes as for the "A" order position, for the "C" order position the cathode of A1 co-operates with the decimal/sterling decoder. By this means it is arranged that the cycle of counting is A1, A2 . . . A10 for a decimal reconversion and A1, A10 for a sterling reconversion.

*Sequence control*

(See Fig. 19)

The sequence control circuit is used to effect the transfer to the compositor of the information registered in the converter and to free the converter for further use whilst a record is being made of the result already obtained. At the same time the sequence control is responsible for informing the input circuit whether or not the converter is ready to receive further intelligence.

The sequence control unit is made up of two main circuits. The first comprises a flip-flop pair of tubes SCA, SCB, which is arranged to give the converter ready and un-ready signals. Further instruction signals are given by the interconnected tubes SCC, SCD and SCE only one of which can be conducting at once.

When the H. T. is switched on a negative potential is arranged to be applied momentarily by means of a relay device (not shown), to the reset leads. This causes tubes SCB and SCE to be fired. Because tube SCB is conducting the converter ready lead is raised to a positive potential by the current passing through the cathode resistance, so indicating to the input circuit that the feeder can transmit its contents to the converter. No further operation takes place in the sequence control until this information has all passed to the converter.

For the reception of the numerical data, the inlet switch is positioned so that tube ISN (Fig. 14) is struck. Hence there is a positive bias on rectifier W255. At the end of the conversion process a positive number end pulse is generated by the conversion limiter which is then applied to rectifier W256. The rectifiers W225 and 256 provide a gating circuit in known manner and when both are biassed positively by applied positive potential, a triggering potential is forwarded to tube SCA, which fires, so extinguishing SCB via the inter-anode condenser C203. The positive potential now derived from the cathode of SCA provides the converter un-ready signal which prevents the input circuit from passing further intelligence until the contents of the converter can be transferred to the compositor. The cathode potential of SCA is also used to give a positive bias to rectifier W257.

Since the circuit is assumed to be dealing with the first number the composition distributor is at its rest position, designated CD0, and rectifier W258 is provided with a positive bias. Also, assuming there is a magnetic storage unit tape machine connected to the code transmitter, rectifier W259 is biassed positively over the tape machine changeover lead. The step pulse which initiates the number end pulse also operates the doubler start tube in the arithmetic unit. Hence although there are no further significant elements in the numerical data the doubler performs one more cycle of operation. During this time rectifier W260, which is connected to the cathode of the doubler stop tube, will be provided with the path DSZ to earth. However, at the end of this cycle the stop tube operates and thereafter rectifier W260 is biassed positively over lead DSZ. Thus a positive pulse now applied to rectifier W261 causes a positive pulse to appear at the common point of rectifiers W262–3 and 264. Pulses are applied to the rectifier W260 at 5 kc./s. frequency from a local generator. Of the three tubes SCC, SCD and SCE, SCE only is struck. Rectifier W265 is therefore provided with a positive bias and this, in conjunction with the bias on rectifier W262 causes tube SCC to strike by forwarding a triggering potential over condenser C204. SCC, on firing, forwards a pulse, over the inter-anode condenser C205, to extinguish SCE. A positive potential is now applied to the transfer control lead from the cathode of tube SCC. As will later be shown, this permits the transfer to the compositor of the intelligence in the converter.

Rectifier W266 is now biassed positively from the SCC cathode so that the next 5 kc./sec. pulse applied to rectifier W260, is fed over rectifier W263 and condenser C206 to fire tube SCD. SCD, on firing, extinguishes SCC over condenser C207. The potential derived from the cathode of SCD is applied to the "start time scale" and "restore arithmetic unit" leads. The positive potential on the restore lead is used to generate a negative pulse which resets the progresser and aggregator to their zero positions so that the arithmetic unit is once again ready for a conversion process. The potential from the cathode of SCD is applied also to rectifier W267; the next 5 kc./sec. pulse not only steps the sequence control from SCD to SCE but also causes SCB to strike, by applying a triggering potential from the rectifier gate circuit W267/W268, and to extinguish SCA. The converter ready signal is sent from the cathode of tube SCB and new intelligence can be passed to the converter.

If during an operation the composition distributor is still dealing with one number when the next number is waiting to be transferred from the converter, SCA is retained in operation to give the converter un-ready signal and transfer cannot take place. This happens because the composition distributor is away from its rest position, and, in consequence, rectifier W258 is provided with a path to earth. Thus SCC is not allowed to strike. When the recording is complete the composition distributor returns to its rest position so that further operations of the sequence control can take place.

In a similar manner, when one tape machine has been filled and the tape machine distributor is changing over to the next tape machine, until the changeover is complete an earth is applied to the tape machine changeover lead so keeping rectifier W259 to earth and preventing the operation of the sequence control. The earth condition is changed to a positive potential when the new tape machine is ready to record results.

*Conversion limiter*
*(Fig. 20)*

The conversion limiter is the unit used to produce the number end signal which, apart from its uses in the converter, is used to inform the input circuit that the existing contents of the feeder have been passed to the converter and the next intelligence can be transmitted when the input circuit is ready to pass it. The conversion limiter also provides the facility of stopping the conversion process when it is known that no further significant elements are present in the result which is undergoing conversion.

A number consists of 36 binary element positions, 35 of which are used to denote a number. These elements can be used to give the equivalent in binary notation of numbers up to $9.9 \times 10$ expressed in decimal form. The numbers which are most often encountered in practice contain far fewer significant digits. As has already been suggested, a saving in time can be effected by carrying out the conversion process only as far as is necessary for the significant digits in the number received. The operation of the arithmetic unit requires in addition one element giving time in which to accomplish the carryover function. The following table gives the relationship between the number of decimal positions, the equivalent number of binary elements and the number of binary elements required by the arithmetic unit.

| Decimal Positions | Equivalent Binary Elements | Required Binary Elements |
|---|---|---|
| 1 | 4 | 5 |
| 2 | 7 | 8 |
| 3 | 10 | 11 |
| 4 | 14 | 15 |
| 5 | 17 | 18 |
| 6 | 20 | 21 |
| 7 | 24 | 25 |
| 8 | 27 | 28 |
| 9 | 30 | 31 |
| 10 | 34 | 35 |

It can be seen from the above that little saving in time is effected by any conversion limiting where decimal numbers having 8 or more digit positions are to be recorded. Furthermore, since information relating to number of positions is passed in a composition instruction it is advisable to limit the number of instruction element positions required for this purpose. In the embodiment being considered, it is proposed to use 3 element positions in the composition instruction to pass this information; this gives a means of recognising 8 different possibilities in the number of decimal positions. In addition to these cases there will be others when it is required to produce additional composition instructions, e. g. tabulation signals, for a number. To carry this out a 0-position number is assumed to follow the composition instruction. The limiting positions are therefore taken as 0, 1, 2, 3, 4, 5 and 7. The eighth condition is used to denote a 10-position number but this is arranged not to cause any limiting action. A 6-position number is not considered as such; instead all numbers which are known to contain 6 decimal positions will be considered as if they were 7-position numbers. Since the input circuit requires a minimum time interval between consecutive number end signals, a 0-position number is considered, for the purposes of conversion limiting as if it were a 1-position number.

Assume that tubes D2M and D2S are one pair of tubes in the decoder (Fig. 16) relating to one composition instruction element position distinguished number of decimal positions. The presence of a pulse fires tube D2M so that a mark-representing potential is forwarded from the cathode of this tube. Leads are taken from D2M and D2S and designated AL. They provide the input to the conversion limiter and are shown in Fig. 20. The two further tube pairs devoted to these signals mark similar leads BL and CL.

The number of positions information contained in the composition instruction is registered in the appropriate section of the decoder. The decoder settings for the different number of positions are as follows:

| Number of Positions | Decoder Setting | | |
|---|---|---|---|
| | AL | BL | CL |
| 0 | S | S | S |
| 1 | M | S | S |
| 2 | S | M | S |
| 3 | M | M | S |
| 4 | S | S | M |
| 5 | M | S | M |
| 7 | S | M | M |
| 10 | M | M | M |

The conversion limiter comprises a flip-flop tube pair, RLA and RLB and an extensive rectifier gating circuit containing rectifiers W269 to W316. The latter circuit is fed by step pulses, potentials from the decoder tube pairs dealing with number of positions indications, and by potentials from certain cathodes (designated K1 to K0) of the multi-gap tubes SPA . . . APD in the step pulse counter.

The operation of the circuit will now be considered. Initially tube RLB is struck when the H. T. is switched on, by the momentary application to the reset lead of a negative potential. When a composition instruction is received from the decoder, the lead from the inlet switch ISN is grounded so that no potentials applied over leads AL, BL and CL from the decoder will affect the trigger electrode of tube RLA. There are received 35 binary elements to register the composition instruction and this requires 35 step pulses. The step pulse counter therefore steps to cathode 9 of tube SPD and a positive bias is applied over lead SPD-K9 to rectifier W269. The next step pulse, which causes the step pulse counter to return to its home position, applies a positive pulse to bias rectifier W277 positively and because W269 is biased positively a positive pulse is fed over decoupling rectifier W285 to the trigger electrode of RLA which strikes and via condenser C208 extinguishes tube RLB. The cathode of RLA provides a positive potential from which a positive number end pulse is generated. This number end pulse changes over the inlet switch so that the lead ISN acquires a positive potential which biases rectifier W286 positively. The circuit is now ready for operation upon the numerical data number.

To illustrate further operation it will be assumed that the result to be converted is known to have a maximum of 5 decimal positions. The setting of the decoder for recognising this instruction will be seen from the above table to be MSM. Rectifiers W291–3, W294–7 and W305–7 are all biased positively from the decoder and the other rectifiers connected to the AL, BL and CL leads are all at earth potential. The arrangement is such that the only combination of biased rectifiers which presents a positive potential to any one of rectifiers W278–285 is rectifiers W292, 294 and 305, all of which are connected to rectifier W283. As the first step pulse is received for the numerical date rectifier W308 becomes positively biased and since, at this time, the step pulse counter has a discharge at cathode 0 of tube SPD, rectifier W309 is also biased positively so that tube RLB strikes, restoring the flip-flop pair. When the correct number of binary elements for a 5 decimal position number have been received the step pulse counter is discharging at cathode 9 of tube SPB, viz. the step pulse counter has made 17 steps indicating that 17 binary elements have been received. Rectifier W271 has a positive bias from lead SPB–K9. The next step pulse, which provides the arithmetic unit with the additional element position, applies a positive pulse to rectifier W310. In combination with the bias on rectifier W286 this applies a positive pulse to W316. Thus, for the duration of the step pulse, rectifier W316, 292, 294, 305 and 271 are all simultaneously biased positively so that tube RLA is struck via rectifier W283. Again the positive potential on the cathode of RLA produces the number and pulse which, when received by the input circuit, prevents further step pulses being transmitted and any attempt to transfer further information elements to the converter.

For those cases in which the size of result is not known beforehand, or if it is greater than 7 positions, the decoder is set to register MMM. The number end signal is then given when the whole number has been received just as in the case of a composition instruction, i. e. when the step pulse counter has stepped to a position providing a positive potential to lead SPD–K9.

*Coder and register*

(Figs. 21A and B, of which Fig. 21B should be placed to the right of Fig. 21A)

The coder is a rectifier network shown particularly in Fig. 21A used to translate a numerical result as recorded in the aggregator of the arithmetic unit to the particular code used for recording on the tape of the magnetic storage unit. The register (Fig. 21B) is used to store this numerical result when it is so coded. In addition to translating and registering the result produced in the arithmetic unit, provision is also made to deal with any intelligence in the composition instruction which has been passed to the decoder but which has to be recorded. Intelligence in the decoder is dealt with in a similar manner to that which will now be described for one digit in a numerical result. Registers and coders are provided on a basis of one for each character which has to be passed from the reconverter to the compositor.

The code assumed in Fig. 21A is the International Telegraph Alphabet No. 2 which is as follows:

| Character | Code |
|---|---|
| 1 | MMMSM |
| 2 | MMSSM |
| 3 | MSSSS |
| 4 | SMSMS |
| 5 | SSSSM |
| 6 | MSMSM |
| 7 | MMMSS |
| 8 | SMMSS |
| 9 | SSSMM |
| 0 | SMMSM |
| Space | SSMSS |

Fig. 21 shows a circuit dealing with one digit of a result, five flip-flop tube pairs CRA . . . CRE being used for registering the five variable elements as M or S. It should be emphasised here that similar circuits are provided for every digit in a result, transfer of all digits from the converter to the coder and register being simultaneous. Consider that the particular digit recorded by the aggregator is 1. A positive potential is then applied to terminal 1 to bias rectifier W318 positively but rectifiers W319–327 remain connected to earth. When the transfer control lead from the cathode of tube SCC in the sequence control circuit acquires a positive potential rectifier W328 is also given a positive bias. The 5 kc./sec. positive pulse which steps the sequence control to the next position also applies a positive pulse to block rectifier W329 and this in conjunction with the positive bias on W328 causes a positive pulse to be applied to rectifiers W330–9. Since W318 is the only rectifier in the leads to the aggregator which has a positive bias, a positive pulse is applied to the decoupling rectifiers W340–4 but no pulse is applied to any of the rectifiers W345–389. It will be seen that W340–4 are connected respectively to the triggers of tubes CRA–M, CRB–M, CRC–M, CRD–S and CRE–M. In consequence, these tubes strike, extinguishing the other tubes in the flip-flop pairs if any of these tubes had been previously conducting. The tubes struck denote MMMSM which is the telegraph code denoting the digit 1. The setting of the flip-flop is accomplished in a similar way for digits 2–9, the connections being such as to produce the codes shown in the above table.

In the event that the digit given by the aggregator is 0, a different operation follows. A requirement already mentioned above is that zeros before a significant digit shall be recorded as space characters but zeros after a significant digit shall be recorded as 0 characters. The flip-flop tube pair, RO–RN (Fig. 21A) is used in combination with the output reader, to be described later, to effect this requirement. When the H. T. is switched on, it is arranged that a negative potential shall be applied momentarily to the reset lead causing RN to strike. When the transfer function is carried out, since rectifier W327 is biased positively when the digit is 0, a positive pulse is applied to the decoupling rectifiers W385–9 causing tubes CRA–S, CRB–S, CRC–M, CRD–S and CRE–S to strike, giving the space character, SSMSS. At the same time a positive pulse is applied over condenser C209 to the trigger electrode of tube RO, striking this tube and extinguishing RN through the action of condenser C210. At this stage ORO, the connection from the output reader, is at earth and so the positive bias from the cathode of RO on rectifier W390 has no effect. Thus, if this digit is transmitted a space character will be recorded. However, if during the transmission of the result a character other than space is detected by the output reader, the latter operates, the connection from ORO becomes positive and rectifier W391 is given a positive bias. The next 5 kc./sec. pulse after this applies a positive pulse to rectifier W392 and the combination of the biases on W390–2 causes CRB–M and CRE–M to strike via rectifiers W393 and 394 (Fig. 39B) respectively. The flip-flop pairs now register SMMSM, i. e. the 0 character. Although all registers which have been set up to record space instead of 0 characters are changed by this operation, the result recorded gives zeros at those only decimal position which follow a digit other than a space as detected by the output reader. The zero recording flip-flop is returned to its normal position at the same time as the character is changed from space to zero. This is accomplished by means of the biases applied to rectifiers W395–6.

If there is a requirement for zero before a significant digit to be suppressed entirely instead of being replaced by spaces, the potentials on the cathodes of RN and RO may be used to switch out the pertinent sections of the composition distributor.

*Composition control*

(Fig. 22)

The composition control is the unit used to re-register that intelligence, passed to the decoder in the composition instruction, which is required to ensure that the composition distributor will be set in accordance with requirements. Such intelligence includes tabulation information, e. g. number of spaces required before a number, and particulars relating to the result, e. g. position of the integer point.

Fig. 40 illustrates that part of the composition control which is used to re-register the "number of spaces" information. It is assumed that there is a requirement for a maximum of 7 spaces, although it should be understood that by using a 0-position number it is possible to increase this number of spaces as desired. The number of spaces information is registered on a binary basis using three flipflop pair tubes CSLM/CS1S, CS2M/CH2S, and CS3M/CS3S. For example, if the requirement is 3 spaces, the three appropriate pairs of decoder tubes are set respectively to mark the decoder leads D1, M, M and S. Thus, rectifiers W397, 399 and 402 are biased positively whilst W398, 400 and 401 will be at earth potential. When the sequence control steps to the condition in which tube BCC, is operated, the transfer control lead becomes positive, so giving rectifier W403 a positive bias. The 5 kc./sec. positive pulse which steps the sequence control to the next position applies a positive pulse to rectifier W404 and, in consequence, rectifiers W405–410 are biased positively for the duration of the pulse. Triggering potentials are therefore forwarded to tubes CS1M, CS2M and CS3S over condensers C211, 2 and 3. The tubes strike, extinguishing the other tubes of each pair if these were already struck. Rectifiers W411–414, W419–422 and W431–434 are now blocked by a positive potential and rectifiers W415–418, W423–426 and W427–430 are taken to earth via their respective tube cathode ground connections. The combination of the positive potentials on rectifiers W412, 420 and 434 causes the busbar indicating a requirement of 3 spaces to be at a positive potential whilst all the other busbars remain at earth potential.

A similar procedure is carried out for all other items of information which have to be transferred from the decoder to the composition control.

*Composition distributor*

Figure 23B:
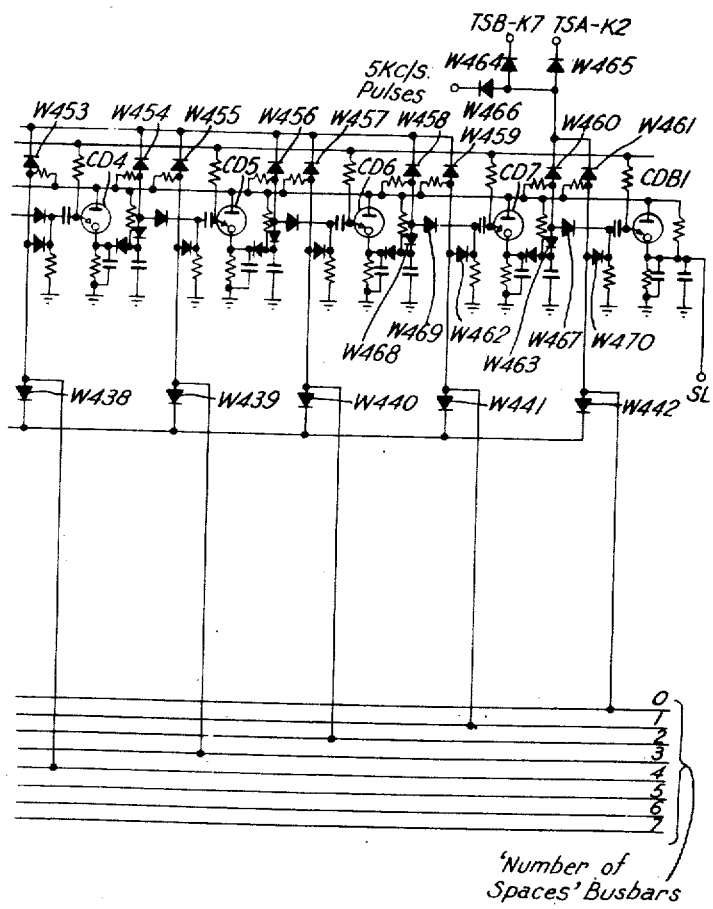

(Figs. 23A and 23B)

The composition distributor is the unit which causes the characters which are to be recorded to be passed from the registers to the code transmitter. The composition distributor has one position for every possible tabulation signal, e. g. if the maximum required tabulation signals for the final teleprinter record are 7 spaces, carriage return and 3 line feeds, there must be 11 distributor positions to deal with these. Also there is provided one position for every possible character in a numerical result, e. g. with the maximum size of number assumed, that is 10 decimal positions, and with commas separating groups of three digits commencing from the integer point and moving leftwards, and up to 3 places to the right of an integer point, there must be 19 distributor positions to deal with the various possibilities. The total distributor positions required is therefore 11+19=30, as shown by the table below.

In the following table setting out the arrangement of the distributor positions the designations "Digit A, Digit B . . . Digit J" have been used for the maximum of ten possible decimal digits in a result to be printed. Not all results will have ten digit places but however many there are, and wherever the integer point is required to be positioned, the least significant digit is the "Digit J." Hence for a three decimal digit result, the "Digits"

H, I and J positions in the composition distributor are brought into use, irrespective of where the integer point has to be placed. A ten digit numerical result will of course require to use the distributor positions reserved for all the "Digits A to J."

Consider now the numerical results indicated by the following:

EFG,HIJ
EF,GHI.J
E,FGH.IJ
EFG.HIJ

By designating the digits of a numerical result in the manner set out above it will be appreciated that a distributor position has to be reserved between each adjacent pair of digits of greater significance than "Digit H." Furthermore an insertion of an integer point is possible between any adjacent pair of digits of less significance than "Digit G." Between "Digit G" and "Digit H" either a comma or an integer point is a possibility. With these various possibilities in mind the following table will be more readily understood.

| Distributor Positions | Character | Distributor Positions | Character |
|---|---|---|---|
| 1 | Space | 16 | Digit E. |
| 2 | do | 17 | Comma. |
| 3 | do | 18 | Digit F. |
| 4 | do | 19 | Comma. |
| 5 | do | 20 | Digit G. |
| 6 | do | 21 | Comma or Integer Point. |
| 7 | do | 22 | Digit H. |
| 8 | Digit A | 23 | Integer Point. |
| 9 | Comma | 24 | Digit I. |
| 10 | Digit B | 25 | Integer Point. |
| 11 | Comma | 26 | Digit J. |
| 12 | Digit C | 27 | Carriage Return. |
| 13 | Comma | 28 | Line Feed. |
| 14 | Digit D | 29 | Do. |
| 15 | Comma | 30 | Do. |

Distributor position 21 is used for either a comma or an integer point. This alternative in no way affects the distributor; the character to be printed is changed in accordance with a register determined of whether the number to be recorded has 0 or 3 places to the right of the integer point. If there are 1 or 2 places to the right of the integer point, it will be seen from the example given above that neither a comma nor an integer point is needed between digits G and H. If there are no decimal places then a comma is required, whilst if there are 3 decimal places, an integer point is required.

The intelligence given in the composition instruction and the signals representative thereof passed to the composition control are used to switch out of circuit unwanted parts of the distributor for a particular result. For instance, if the composition instruction has stipulated that the requirement is 1 space, a 6-position number having 2 places to the right of the integer point, carriage return and 1 line feed, the distributor will be switched so that only the following positions are in circuit, the other position being switched out.

| Distributor Position | 7 | 16 | 17 | 18 | 20 | 22 | 23 | 24 | 26 | 27 | 30. |
|---|---|---|---|---|---|---|---|---|---|---|---|
| Character | space | Digit E. | Comma | Digit F. | Digit G. | Digit H. | Integer Point. | Digit I. | Digit J. | Carriage Return. | Line Feed. |

Figs. 23A and 23B, together forming Fig. 23, show that part of the composition distributor used for the purpose of causing transmission of spaces. It consists essentially of an interconnected chain of cold cathode gas-filled glow discharge tubes CD0 . . . CD7. The operation of these is controlled from the "number of spaces" busbars which are themselves fed from the composition control circuit. In the rest condition of the present circuit tube CD0 alone is fired. Tubes CD1–7 provide the composition distributor positions related to spaces and CD8 is the first of two buffer tubes whose purpose will be explained later. For result in which there is to be 1 space before the digits are printed, "number of spaces" busbar 1 is provided with a positive potential from the composition control, the other busbars being at earth potential. Initially CD0 is struck by the momentary application of a negative potential applied to the reset lead when the H. T. is switched on. The cathode potential of CD0 applies a positive bias to rectifiers W435–442.

Under control of the time scale (Fig. 24), described below, positive potentials are applied to both of the leads TSA–K2 and TSB–K1. The result is that both rectifiers W443 and 444 are biased by a positive bias. The next 5 kc./sec. pulse which is applied to step the time scale also applies a positive pulse to bias rectifier W445 positively. In consequence, this rectifier gate circuit is opened and a positive pulse is applied to all of the rectifiers W446–459. Since all busbars except No. 1 are at earth potential no triggering positive potential is forwarded except that to tube CD7 via rectifier W462. Tube CD7 fires extinguishing CD0 and thereby removing the positive potential from rectifiers W435–442. The cathode potential of CD7 applies a positive bias to rectifier W463.

The composition distributor remains stationary on CD7 for a period in which the five code elements denoting the space character are passed to the code transmitter.

At the end of this time the time scale applies positive bias to lead TB–K7 and, immediately subsequent to this, a similar bias is applied to lead TSA–K2 so that both rectifiers W464 and 465 are biased positively. The next 5 kc./sec. pulse is applied to bias rectifier W466 positively also so that now rectifiers W460 and 461 are biased positively. CDB1, the buffer tube, is caused to strike via rectifier W467. The distributor remains on CDB1, which thereby provides a second transitory rest position, until once again TSA–K2 and TSB–K1 become positive when the required tube in the next section of the distributor which is prepared for operation by the potential to lead SL from CDB1 cathode is struck in a manner analogous to that described for tube CD7. This means that the buffer tube is struck only during the stop period for the previous character so that it does not affect the recording.

Had there been a requirement for 2 spaces indicated by the composition instruction, tube CD6 and not CD7 would have been struck after CD0. This would have caused a positive bias to be applied to rectifier W468 so that on the next occasion that the time scale provided positive potentials on leads TSA–K2 and TSB–K1, i. e. after the space character related to CD6 had been transmitted, CD7 would have been struck via rectifier W469 and the operation would have proceeded as described. The circuit operates in similar manner for any other number of spaces, except for the case of 0 spaces, the arrangement for which will now be described.

The busbar for 0 spaces is at a positive potential so that when the time scale provides biases on leads TSA–K2 and TSB–K7 in its first cycle of operation, CDB1 strikes immediately via rectifier W470. It remains struck until the time scale biases leads TSA–K1 when the next required character tube will strike, say a tube CD8 of another part of the composition distributor (not shown). Again the buffer tube is extinguished before transmission of the code elements of the next character.

When all characters have been transmitted, in all cases the composition distributor returns to its home position, CD0, and the time scale and distributors are stopped until it is necessary to transmit the next result. The composition distributor will then again be switched by the composition control, in accordance with the new requirements.

*Time scale*

(Fig. 24)

The time scale is the unit used to provide the 8-unit telegraph code used for recording the characters designated by the composition distributor. The time scale also provides the control potentials for stepping the composition distributor and the timings for the code transmitter.

Because of considerations connected with the tape machines used for recording, it is proposed to carry out recordings at 1000 bauds. This means that each unit-period will be 1 millisecond. In order to produce pulses with such an inter-pulse interval 5 kc./sec. pulses are applied to a divide-by-5 stage. This stage comprises tube TSA and it controls the unit-period-producing multi-cathode tube TSB. The tube TSA, a decade multi-gap tube is arranged to divide by 5, by connecting cathode 1 to cathode 6, cathode 2 to cathode 7, . . . , and cathode 5 to cathode 0. By suitable inter-connections of three cathodes, tube TSB is arranged to provide a divide-by-8 stage to give the 8 unit-periods for the telegraph code.

When the H. T. is switched on a relay (not shown) momentarily applies a negative potential to the reset lead causing the stop tube, TSZ, to strike. As the anode potential of TSZ falls from the full H. T. level to the sustaining voltage of the tube a negative pulse obtained from the anode of tube TST at point R is applied to the R leads in the cathode circuits of tubes TSA and TSB. The glow in the multicathode tubes is thereby caused to be positioned at either cathode 1 or 6 of tube TSA and on cathode 7 of tube TSB. Since TSA is cathode-connected to operate as if it were a 5-gap tube, it is immaterial whether the glow is positioned at cathode 1 or 6. In the following description it will be assumed that the glow discharge starts on cathode 1.

In the rest condition both gate tubes TGA and TGB are unoperated and the gates are therefore closed. When recording of a number is to take place, the sequence control circuit applies a positive potential to lead SCD and rectifier W471 is given a positive bias. The next 5 kc./sec. pulse causes rectifier W472 to become positively biased also for the duration of the pulse so that a triggering pulse is forwarded over condenser C214 and the start tube, TST, strikes. The tube TSZ is extinguished by TST becoming conducting. The cathode potential of TST is applied directly to the trigger of gate tube, TGA, so that the next 5 kc./sec. negative pulses applied to the cathode of TGA fires the latter tube. The immediate fall in potential across the anode resistance of TGA provides a negative-going pulse which is fed, over condenser C215, to the transfer electrodes of tube TSA. The glow discharge in this tube steps to cathode 2.

TSA makes one step for each applied pulse and will continue to step until the stop tube is operated. When the discharge in TSA reaches cathode 5, TGB is fired by a triggering potential being forwarded via decoupling rectifier W473. The next 5 kc./sec. pulse causes TSA to step its discharge to cathode 6 and TSB from cathode 7 to 8. TGB remains fired via rectifier W474 and so when TSA steps from cathode 6 to 7, TSB will step from cathode 8 to 9. Again TGB remains fired, this time via rectifier W475. When TSA takes a further step to cathode 8, TSB steps to cathode 0. The gate provided by TGB is now closed but it is reopened when TSA discharge steps to cathode 0. TSB then steps from cathode 0 to 1 as TSA likewise steps from cathode 0 to 1 after which the gate tube TGB is again extinguished. It can be seen that the discharge in tube TSB travels along cathodes 8, 9 and 0 whilst TSA steps from cathode 5 to cathode 1. In effect, these three cathodes 8, 9 and 0 of tube TSB combined provide an operation equivalent to one of the remaining TSB cathodes. The 8 unit-periods are obtained from the TSB tube with each period equal to the time taken for TSA to step from cathode 1 to cathode 6 or from cathode 6 to 1.

TSA continues to step and TSB is allowed to make one step whenever TSA steps away from cathode 5 or 0 except in the particular case of TSB, cathodes 8 and 9 for which the stepping is as described above. The circuit arrangement is such that TSA operates as a divide-by-5 circuit and TSB as a divide-by-8 circuit; leads taken from cathodes 1 to 8 of tube TSB provide timing potentials for the eight unit periods. The time during which the glow discharge remains on cathode 1 of tube TSB provides the first unit-period of the telegraph code, i. e. the start element, cathodes 2–6 of TSB give the five code element unit-periods, and cathodes 7 and 8 of the same tube give TSBK–7 the first and second stop elements respectively.

After all characters have been recorded, the composition distributor returns to its home position, thereby providing a potential on lead CD0. (The composition distributor is arranged to make its first step from tube CD0 therein before the time scale circuit operation reaches the condition in which cathodes 3 and 1 of tubes TSA and TSB respectively are conducting in their first cycle of operation.) Lead CD0 gives rectifier W476 a positive bias. At this time TSB has cathode 1 conducting so giving a positive bias to rectifier W478. TSA steps its discharge to cathode 3 and applies a positive bias to rectifier W477 so that when the next 5 kc./sec. pulse is applied to bias rectifier W479 positively, tube TSZ strikes, TST is thereby extinguished and this action removes the positive potential from the trigger of TGA. The striking of TSZ also causes a negative pulse to be applied to the R leads and the glow discharge in the multicathode tubes wil be restored to cathode 1 in tube TSA and cathode 7 in tube TSBK–7, i. e. the rest positions.

It will be appreciated that other rest positions could be used for the time scale. The rest positions chosen are preferred because they give the maximum time interval before the composition distributor has to step to its first working position. This time interval is used to allow the composition distributor to step from the buffer tubes used therein. There are probably many more characters to record than those listed in the description of the composition distributor, entailing more buffer tubes to simplify the circuit. Since the buffer tubes are connected permanently in circuit it may be necessary to pass over a number of these before the first character to be recorded is reached.

*Transmitter*
(Figs. 25 and 26)

The transmitter is the unit used to supply potentials to a magnetic tape recording machine in accordance with the information it is desired to record. It is controlled by the registers, the time scale and the composition distributor to cause telegraph signals to be passed to a magnetic tape machine which produces a record of the contents of the registers. The registers themselves provide the characters which are to be recorded, the time scale produces the unit-periods for the code signals and other time intervals necessary and the composition distributor passes the characters forward in their correct sequence.

Since each character consists of a start element, five code elements and two stop elements and the number of characters required for recording one result may be considerable, the transmitter is designed as a cascade arrangement. This obviates the necessity of having too large a number of controlling sources for any one tube. For example, if there is a possibility of having 30 characters in a result, the number of variable code elements would be 5×30=150, involving 150 controlling sources for a flip-flop tube pair used for the transmitter. By suitably dividing these sources it is possible to arrange that there would be, say, 8 flip-flop tube pairs each controlled from approximately 20 sources, and these pairs could be examined consecutively to control a further stage. To further reduce the controlling networks, it is arranged that the elements are examined for a "space" condition only and an automatic return of the flip-flop pairs to the "mark" condition is used.

Fig. 43 shows the controlling rectifier network used for the flip-flop tube pair TRIM/TRIS associated with the first three characters of a result. There are other tube pairs, TR2M/TR2S, TR3M/TR3S . . . (not shown) and suitable networks for other groups of three characters. Since the start and stop elements are invariable and are used for all characters, these may be inserted at the final stage of the transmitter as will later be explained in connection with Fig. 44.

Initially, it is arranged that a momentary application of a negative potential is made to the reset lead causing tube TRIM to strike. Assume that the characters associated with composition distributor positions CD1 and CD2 are to be recorded but the character associated will position CD2 is not required and further assume CD1 is associated with a space character, SSMSS.

As previously mentioned the composition distributor steps from its home position, CD0, to CD1 when the time scale steps from cathode 2 to 3 of tube TSA with cathode 1 of tube TSB conducting in the first time scale cycle, that is, before it is necessary to transmit the code elements. Thus rectifiers W486 and 497 and other corresponding rectifiers connected to CD1 are given a positive bias but connections fed from other distributor positions are at earth potential. When the time scale steps to cathode 3 of tube TSA and cathode 2 of tube TSB, rectifiers W481 and 483 acquire a positive bias but connections to the remaining TSB cathode positions are at earth potential. The next 5 kc./sec. positive pulse applied to rectifier W480, in conjunction with the bias on W481, causes a positive pulse to be applied to rectifiers W482, 493, 504, 506 and 508. However, rectifier W483 is the only TSB connection with a positive bias, so that the pulse will be applied to rectifiers W484, 487 and 490 but not to rectifiers W495, 498 and 501 or to rectifiers of other such sub-networks. Furthermore, since W486 is the only rectifier in the first sub-network to be biased positively by the composition distributor, the only path over which the flip-flop pair TRIM/TRIS can be affected is that over rectifiers W480, 481, 483, 485 and 486. It has been assumed that the first code element of the character associated with CD1 is a space. Therefore, tube CRAL–S, over the connection from the associated register, transmits a positive potential giving rise to a positive bias to rectifier W485. Thus, a positive pulse is applied via decoupling rectifier W510 to the trigger of tube TRIS, striking this tube and thereby extinguishing tube TRIM. Had the first code element been a mark, lead CRAL–S would have been at earth potential and the operated condition of tube TRIM would not have been disturbed.

The time scale continues to step until when it reaches a position in which cathode 5 of tube TSA is conducting, when rectifier W525 is given a positive bias and the next 5 kc./sec. pulse applied to rectifier W526 produces a triggering potential which restrikes tube TRIM if necessary extinguishing tube TRIS. At the time TSB is stepped from cathode 2 to 3 and a positive bias is applied to rectifier W494; the other rectifiers connected to TSB cathodes, e. g. W509 being connected to earth. The next time rectifiers W480 and 481 become positively biased, a positive pulse is applied to W495, 498 and 501. Again since rectifier W497 is the only connection to the distributor in this sub-network to have a positive potential the flip-flop is now controlled via decoupling rectifier W513. The second element, marked over lead CRBL–S, has been assumed to be a space, and therefore, W496 has a positive bias. Tube TR1S therefore again strikes by means of a positive pulse applied from the rectifier gating circuit over the decoupling rectifier. Again the flip-flop tube pair is restored to its normal condition with tube TRIM struck when rectifiers W525 and 526 become positive. The third element is now examined at the time position given by potentials appearing simultaneously on leads TSA–K3 and TSB–K4 and the flip-flop controlled via decoupling rectifier W516. For the example being considered, the third element is a mark so that no positive potential is applied to lead CRC1–S. Hence no triggering potential is forwarded to the flip-flop pair and this remains with TRIM conducting.

The two remaining elements for the character associated with CD1 will be examined in similar manner and TRIM/TRIS controlled via rectifiers W519 and 522 respectively. The two elements in question have been assumed to be space and, in consequence, tube TRIS will be struck for each at a time given by a potential appearing on lead TSA–K3 and extinguished at a time given by a similar appearance on lead TSA–K5. It should be noted that, for a space element, the cathode of tube TRIS becomes positive for a period during which the time scale is on cathode 4 and 5 of tube TSA.

Before the code elements of the next character have to be transmitted, the composition distributor steps to the position associated with this character. It has been assumed that CD2 is not required for the particular result. The composition control will cause this position to be switched out of circuit and the distributor will step from CD1 to CD3, via a buffer tube if one is used in this part of the composition distributor. The flip-flop pair TRIM/TRIS is now controlled by means of the rectifier gating sub-networks associated with CD3. TRIS is once more struck for space elements and the flip-flop pair is restored to the TRIM conducting condition after two further steps of the time scale.

When the code elements associated with the distributor positions connected to the controlling network of the tube pair TRIM and TR2M have all been examined, the final condition is with TRIM conducting. Further characters associated with other flip-flop pairs TR2M/TR2S etc. will be examined in a similar manner. It can be seen that by this arrangement whilst one flip-flop is being set according to the elements being examined, the others are resting in the mark condition. This factor is used in controlling the second part of the transmitter, shown in Fig. 26.

Connections are taken from the cathodes of the space tubes, TR1S, TR2S, TR3S etc., to a rectifier network used to control the flip-flop tube pair, TM–TS. Also in this stage is the connection by means of which the space element indicating the start unit-period is inserted.

When TRIM, TR2M etc., are initially struck tubes TM and TXM also are fired by potentials applied to their cathodes over the respective reset leads. Before the first code element is examined by TR1M/TR1S both rectifiers W527 and 530 (Fig. 26) are biased positively whilst the time scale potential is on lead TSB–K1. A 5 kc./sec. positive pulse is applied via rectifier W538 to the trigger electrode of tube TS. At this time the connections from TR1S, TR2S etc., are at earth potential as the respective flip-flop pairs are all in the mark condition. Tube TS strikes, extinguishing TM, so giving a positive bias to rectifier W545; W545 is connected to earth. The same positive pulse steps the time scale to produce a potential on lead TSA–K5 so that rectifiers W547 and 548 are given a positive bias. The next 5 kc./sec. pulse which steps the time scale to cathode of tube TSA and cathode 2 of tube TSB gives also a positive bias to rectifiers W546 and 548 for the duration of the pulse and, because of the potential already applied to W544, TXS strikes, extinguishing TXM. The output potentials taken from the cathodes of tubes TXM and TXS are used to control the record made on the magnetic tape used for storing the result.

The tube pair TM/TS is restored to its normal condition with TM conducting by means of the biases applied to rectifiers W542 and 543 but tube TXS remains conducting. The next time that the time scale steps to provide a potential on lead TSA–K4, TSB cathode 2 is conducting so that the connection to TS via rectifier W537 loses control. However, the connection from TR1S becomes positive whenever the code elements of the first character represent spaces and it remains at the positive potential for the time the time scale is on has its TSA discharge on cathodes 4 and 5. Connections from TR2S, TR3S . . . , are still connected to earth. It was assumed that the first code element was a space so that when rectifiers W527 and 528 become biased positively, W533 is also positively biassed and tube TS is therefore struck by a triggering pulse applied via rectifier W539. The conditions (positively biassed or not) of W544 and 545 are again examined before the tube pair TM/TS is restored and since rectifier W545 has a positive bias due to TS conducting, tube TXS remains struck. Had the first variable element been a mark, W543 and not W544 would have had a positive bias so that TXM would then have been struck, extinguishing TXS, and causing a mark indication to be recorded on the tape.

TM is again restruck when the time scale gives a potential on lead TSA–K1. In like manner the other code elements denoted by the present or absence of positive potentials on the connection from TR1S are examined. It should be noted that TXM/TXS is not automatically restored as is the case with the other flip-flop pairs but changes over only when there is a change of polarity detected in the examined elements. After the code elements of the first character have been examined TM restores to its conducting state and this flip-flop pair remains in this state until the time scale returns to the condition in which potentials are produced on leads TSA–K4 and TSB–K1 enabling another start element to be inserted before the next character to be recorded. The time interval between the end of the fifth code element and the next start element is equal to two unit-periods and provides the two recorded mark elements used for the stop portion of the character combination.

The potentials on TR2S, TR3S . . . , are examined in similar manner and the signals denoting the code elements of the different characters are passed in correct sequence to the recording medium.

Although connections have been shown for all code elements in Fig. 26, it should be understood that in the case of an invariable character, e. g. line feed, associated with a particular distributor position only the space elements need be connected in the network. The mark elements of such a character would be inserted by the flip-flop tube pair remaining in the condition for recording a mark.

*Output reader*

(See Fig. 27)

The output reader is the unit used to examine the output immediately preceding its recording on the tape machine so that a digit other than zero can be detected. As has previously been explained detection controls such changes in the registers as may be required.

Since it is possible that there may be characters other than space characters which have to be recorded before the numerical portion of a result is reached the output reader must be prevented from operating until the numerical portion is being transmitted. The buffer tube preceding the composition distributor positions associated with the numerical part of the result is therefore used for energising the output reader. The buffer tube in the composition distributor following the numerical position is used to cut off the output reader.

A space character is given by SSMSS. To simplify the output reader it is preferred to look for the opposite element in any of these positions, i. e. a character is examined for mark in the first code element position, mark in the second, space in the third, mark in the fourth and mark in the fifth. The correct times for examining the elements are given by the time scale.

The output reader consists essentially of a complex rectifier gating circuit (shown at the top of Fig. 27) and two flip-flop tube pairs comprising tubes ORN, ORO, SOR, UOR. The rectifier gating circuit controls the tube operation in conjunction with potentials provided from the buffer tube cathodes as suggested above. The leads from the buffer tubes are referred to as "Buffer 1" and "Buffer 2" respectively.

When the H. T. is switched on a negative potential is applied momentarily by means of a relay to the reset leads so causing tubes UOR and ORN to strike. The cathode of ORO is connected to the registers and since, at this time, ORO is extinguished, there will be an earth potential applied to this connection. Also since tube SOR is extinguished rectifiers W550 and 551 are connected to earth over rectifier W552. Hence the rectifier gating circuit is wholly grounded and no application of 5 kc./sec. positive pulses can strike ORO even though all other rectifiers have a positive bias. The circuit remains in this condition whilst all characters required to appear before the numerical portion of the result are being transmitted. During the stop element of the last of these transmitted character combinations, the composition distributor steps to the buffer tube preceding the numerical position and the lead "Buffer 1" acquires a positive potential. Rectifier W553 is then given a positive bias. Whilst this bias is present a 5 kc./sec. pulse applied to rectifier W554 causes tube SOR to strike, thereby extinguishing UOR. A positive bias is now applied from the cathode of SOR to rectifier W552 so that no longer are rectifiers W550 and 551 provided with a path to ground. The output reader is now ready to examine future transmitted signals.

At a time given by the arrival of positive potentials on leads TSA–K5 and TSB–K2 the state of the cathode of tube TM in the transmiter (Fig. 26) is examined via lead TM (Fig. 25). The potential on TM is the complement of that of lead TS from tube TS in the transmitter, i. e. when TM is positive, TS is at earth and vice versa. If a mark is being transmitted, TM lead is at a positive potential and rectifier W555 has a positive bias. Hence when a 5 kc./sec. pulse is applied to bias rectifier W556 positively the combination of rectifiers W550, 555, and 557 all being positively biassed causes rectifiers W558–561 to be positively biassed. As rectifier W562 is biassed positively over lead TSB–K2 tube ORO is made to strike by a triggering potential applied via decoupling rectifier W563. However, if a space is being transmitted, lead TM will be at earth potential and so no triggering potential can be forwarded over W563. The other possible controlling network comprising rectifiers W551 and 564–8 is at this time rendered inoperative by reason of an earth potential found on the TSB–K4 lead.

If ORO is struck it is known that the first code element of the character being transmitted is not a space. Hence the potential from the cathode of ORO can effect the necessary change in the registers which are registering a space instead of a zero character. At a time given by potentials appearing on leads TSA–K5 and TSB–K3 the second code element is examined for a mark. If a mark is present, TM lead is at a positive potential and should ORO not have struck during the examination of the first element it would be struck via rectifier W569. As it is tube ORO remains fired. Similarly the third element is examined. this time for a space given by marking the TS lead at a time given by potentials appearing on leads TSA–K5 and TSB–K4; the fourth and fifth elements are examined for a mark condition at times given by indications over leads TSA–K5, TSB–K5 and TSA–K5, TSB–K6 respectively. Tube ORO is struck by any condition which detects that the code element then being reviewed is a code element of a character other than a space character.

After the numerical part of the result has been recorded the composition distributor steps to the next buffer tube, so that lead "Buffer 2" is brought up to the potential of the conducting cathode of the associated tube. Rectifiers W570 and 571 are given a positive bias so that when a 5 kc./sec. positive pulse is applied to rectifiers W572, and 573, tubes UOR and ORN are struck. The output reader is thereby returned to its rest condition and is ready to be used in connection with the next result.

*Tape machine distributor*

(Figures 28–33)

The tape machine distributor consists of two main circuits. The first is a gas-filled discharge tube circuit (Fig. 28) which operates under the direction of various units of the converter and compositor and the second is the relay circuit (Fig. 29) which is controlled by the tube circuit. The latter circuit comprises three flip-flop tube pairs ATE/ATF, COR/COC, ATC/TMC. In the anode circuit of tube ATC is a relay PZ which exercises a starting function over the relay circuit. The latter has four distinct contact circuits and these are numbered Figs. 30 to 33. Fig. 30 shows the A. C. supply arrangement for the motors of the three magnetic tape storage machines to each of which the information to be recorded is passed in turn. Fig. 31 provides the contact arrangement for passing information from the transmitter to whichever one of the tape machines is in use at a particular time. Fig. 32 shows a circuit for starting up the mechanical timing mechanisms associated with each of the tape machines. Fig. 33 gives the lamp indication scheme for showing the state of readiness of the three tape machines.

The magnetic tape storage units themselves as far as the driving mechanism and general construction are concerned are each similar to that described in British patent specification Nos. 685,067 and 685,109. The machine makes use of an endless loop of magnetic tape which is driven independently past recording and reproducing heads. The two bights of slack tape between the two heads are both contained within a single storage compartment having no internal divisions. This compartment is made removable from the recording and reproducing equipment proper in the manner disclosed in British patent specification No. 672,576. Each tape storage container is loaded ready on to a recording machine and this action closes the earth contacts, such as "tape M/C No. 1," connected to the left hand winding of relays AZ, BZ and CZ (Fig. 29).

When the H. T. is switched on, a relay applies negative potential momentarily to the reset leads causing tubes ATF, COC and TMC (Fig. 28) to strike. No relays of the Fig. 29 circuit or relay PZ of Fig. 28 circuit are operated at this time.

When the recording of information is to take place, the start key is thrown. Relay AZ operates via $pz1$ back, $cz2$, $bz2$ and $bua2$ all back, relay A to earth. The operation of the start key also causes the green lamps to light (see Fig. 33) but relay AZ operating changes over connect $az7$ and the amber light of machine 1 is lit indicating that this machine is to take the first part of the recording. Contact $az1$ front prepares a locking circuit for AZ and operating circuits for relays BUA and BZ. Contacts $az2$ and $az3$ front apply 50 cycles/sec. mains to the motor of machine 1, $az4$ and $az5$ front connect the transmitter to the recording head of machine 1 and $az6$ front starts the timing device associated with this machine. Recording now takes place on this machine. When the tape is nearly full, contacts on the timing mechanism apply a positive potential to rectifiers W574; it is not desired to stop the machine at this time and change to the next machine for a changeover of machine takes place only when the complete contents of an annex tube have been received and recorded. When the last number in an annex tube has been passed to the converter, the annex changeover pulse causes rectifier W575 to be biassed positively and this, in conjunction with the bias from the tape timer causes tube ATE to strike thereby extinguishing ATF. A positive bias is applied from the cathode of ATE to bias rectifier W576 positively. When the last number is to be passed from the converter to the compositor the transfer control lead from the sequence control circuit becomes positive and the next 5 kc./sec. pulse from the local generator effects the transfer. This causes a positive bias to be applied to rectifiers W577 and W578 which, together with the bias already on rectifier W576, results in tube COR striking, thereby extinguishing tube COC. At the same time rectifiers W579 and 580 are also biased positively so that ATF restrikes extinguishing ATE. Rectifier W581 now has a positive bias from the cathode of COR. When the last result from the annex tube has been recorded when the time scale reaches positions at which it applies positive potentials to leads TSA–K3 and TSB–K1 and when the composition distributor has tube CD0 fired, rectifiers W582–3 and –4 are all biassed positively so striking ATC and extinguishing TMC. The tape machine changeover can now take place; the removal of the bias from the lead to the sequence control lead prevents further information from being passed to the compositor until the changeover is complete.

The striking of ATC causes relay PZ to operate. Contact $pz5$ front applies a positive potential to COC, striking this tube and extinguishing COR. $pz2$ and $pz3$ front contacts break the motor circuit of machine 1 (see Fig. 30) and $pz4$ front stops the tape timer of this machine which is automatically reset. Contact $pz1$ front completes the locking circuit of relay AZ via $az1$ front and also operates relays BUA and BZ. $bua7$ front locks relay BUA to the tape machine No. 2 earth, $bua2$ front breaks the operating circuit of relay AZ and $bua3$ front prepares, the circuit to light the red lamp of machine 1 to indicate "tape container full." Contact $bz1$ front prepares the locking circuit of relay BZ and the operating circuit of relays BUB and CZ. Front contact $bz2$ completes the locking circuit of relay BZ for when contact $pz1$ restores, $bz3$ and $bz4$ prepare machine 2 motor circuit. Front contacts $bz5$ and $bz6$ connect the transmitter to machine 2, $bz7$ front prepares the timing device of machine 2, $bz8$ front light machine 2 amber lamp showing machine 2 in use and $bz9$ applies a positive pulse to the trigger of TMC. This tube strikes and extinguishes ATC, which action causes relay PZ to release. Contact $pz1$ releasing causes AZ to release and also starts the motor of the second machine. The application of a positive potential from TMC cathode to the sequence control lead allows further information to pass to the compositor, and further recording takes place on machine 2.

When AZ is released the red lamp of machine 1 is lit via $az7$ back and $bua3$ front to indicate that this tape container can be changed. The removal of the container breaks the earth connection so that BUA releases and the green lamp of machine 1 is lit. The new box is loaded so preparing the operating circuits of relays AZ and BUA.

Again when machine 2 is nearly full an indication is given by machine 2 tape timer so that when the last result in the current output annex tube has been recorded ATC is again struck and PZ operated. The sequence of striking of the gas tubes is then followed through again as described for machine 1. In the relay circuit BUB and CZ operate via $pz1$ front, $az1$ front and $bz1$ front. Contacts $pz2$ and $pz3$ front break the motor circuits and $pz4$ front breaks the timing circuit. Contact $bub1$ front locks relay BUB to the tape machine earth, ang $bub3$ front prepares the circuit of the red lamp associated with machine 2. Relay CZ operated causes a pulse to be applied to the trigger of TMC over $cz9$ front striking this tube and releasing relay PZ. On contact $pz1$ restoring relay BZ is released but CZ is held via $pz1$ back and $cz2$ front. Back contacts $pz2$ and $pz3$ connect the mains supply to the motor of machine 3 and $pz4$ back starts machine 3 timing circuit and recording now takes place on machine 3, via $cz5$ and $cz6$ front contacts. BZ releasing causes machine 2 red lamp to light via $bz8$ front and $bub3$ back indicating that the container on this machine can be changed.

The next time PZ is operated, BUC operates via $pz1$ front, $az1$ back, $bz1$ back and $cz1$ front. Contact $buc1$ front locks relay BUC, $buc4$ front breaks the holding circuit of CZ allowing CZ to release and $buc3$ front prepares the red lamp circuit of machine 3. Also $pz1$ front causes CZ to release, so that the red lamp lights via $cz8$ back and $buc3$ front. On contact $cz9$ releasing a pulse is applied to TMC causing this tube to strike and release PZ. Contact $pz1$ back causes AZ to operate via $cz2$ back, $bz2$ back and $bua2$ back and the cycle of operation proceeds.

If a full tape container has been removed and no replacement loaded on a machine, the relay associated with this machine, e. g. AZ relay for machine 1, cannot operate since the tape machine earth connection is broken and so recording stops at this machine until a new container is loaded. If necessary alarms could be included to indicate this condition.

If a full tape container has not been removed, say, on machine 1 BUA will remain operated and the operating circuit of AZ is broken by $bua2$ front contact so that when recording has ended on machine 3, AZ cannot be operated. In the case of machines 2 and 3 the same function is provided by contacts $bub2$ and $buc2$ respectively; these contacts are used to short-circuit the operating windings of relays BZ and CZ thus preventing them from operating until the full tape containers have been removed and new containers loaded on the machines.

It can be seen that relays AZ, BZ and CZ as shown in the circuit are heavily loaded with contacts. This may be avoided by the use of relief relays but such arrangements are not necessary for explanatory purposes.

What we claim is:

1. In information handling equipment, a plurality of storage devices, first switching means for connecting said storage devices in turn to an input circuit, means for transferring items of information received over said input circuit to any one of said storage devices in succession at a first speed, a converter for converting items of information received from said input circuit in a first form to a second form suitable for controlling an electrical recording device, second switching means for connecting said converter to said storage devices in turn, means in each storage device for recycling the items of information contained therein, means for transferring an item of information in said first form in succession from any one of said storage devices to said converter each time the items stored therein are recycled, whereby said information is transferred at a second speed less than said first speed, whereafter said converter functions to convert said information from said first form to said second form, a plurality of electrical recording devices each of which can make a record of information supplied to it in said second form, third switching means for connecting said converter in turn to said recording devices, and means for transferring items of information in said second form from said converter to any one of said recording devices.

2. In information handling equipment, an input circuit over which information and control signals relating thereto are received, an output circuit over which information may be transmitted, a converter for converting received information from one form of presentation into one of a plurality of forms of presentations, and means responsive to a control signal to set said converter to the condition appropriate to the information to be connected and to which said control signal relates, and means whereby for feeding information from said input circuit to said output circuit via a plurality of stages at successively lower speeds, said feeding means comprising storage means for storing successive items of said information, means for recycling said items in said storage means, and means for feeding an item of information to the next succeeding stage for each successive recycling of said information items.

3. In information handling equipment an input circuit over which items of information are received, an output circuit over which items of information may be transmitted, means including a plurality of stages for transmitting said information items between said input and output circuits, means between two of said stages for transmitting said information items at a lower speed than the speed of transmission between preceding stages, and means in one of said succeeding stages for converting said information items from one form of presentation to another, said first mentioned transmitting means comprising storage means for storing a plurality of said items of information in succession and means for recycling said stored items within said storage means, said second mentioned transmitting means comprising means for transferring one item at a time from said storage means each time said items are recycled.

4. In information handling equipment, the combination, as defined in claim 9, in which the items of information are divided into two groups, a control group and an information group, the control group preceding the information group, said combination further comprising means responsive to said control group for setting the converting means to the condition appropriate to the next information to be converted and to which said control group relates.

References Cited in the file of this patent

UNITED STATES PATENTS

| | | |
|---|---|---|
| 2,207,743 | Larson | July 16, 1940 |
| 2,248,820 | Haselton | July 8, 1941 |
| 2,702,380 | Brustman | Feb. 15, 1955 |

UNITED STATES PATENT OFFICE

CERTIFICATE OF CORRECTION

Patent No. 2,831,179                                        April 15, 1958

Esmond Philip Goodwin Wright et al.

It is hereby certified that error appears in the printed specification of the above numbered patent requiring correction and that the said Letters Patent should read as corrected below.

Column 44, line 5, for the claim reference numeral "9" read -- 3 --.

Signed and sealed this 15th day of July 1958.

(SEAL)
Attest:

KARL H. AXLINE                                              ROBERT C. WATSON
Attesting Officer                                       Commissioner of Patents